(12) United States Patent
Gupta et al.

(10) Patent No.: US 10,305,640 B2
(45) Date of Patent: May 28, 2019

(54) COMMUNICATION METHOD OF NODE IN CONTENT CENTRIC NETWORK (CCN) AND THE NODE

(71) Applicant: SAMSUNG ELECTRONICS CO., LTD., Suwon-si (KR)

(72) Inventors: Abhishek Gupta, Bangalore (IN); Bhargavi M. Shankarananda, Bangalore (IN); Kushal Bansal, Punjab (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 14/803,323

(22) Filed: Jul. 20, 2015

(65) Prior Publication Data

US 2016/0020887 A1 Jan. 21, 2016

(30) Foreign Application Priority Data

Jul. 18, 2014 (IN) .......................... 3541/CHE/2014
Mar. 20, 2015 (KR) ........................ 10-2015-0038852

(51) Int. Cl.
*H04L 1/18* (2006.01)

(52) U.S. Cl.
CPC .......... *H04L 1/1848* (2013.01); *H04L 1/1877* (2013.01)

(58) Field of Classification Search
CPC .................................................... H04L 1/1877
See application file for complete search history.

(56) References Cited

U.S. PATENT DOCUMENTS

| | | | | |
|---|---|---|---|---|
| 7,296,076 B1 * | 11/2007 | Portolani | ............ | H04L 67/1027 709/217 |
| 2001/0016896 A1 * | 8/2001 | Pitts | .................... | G06F 12/0813 711/136 |
| 2004/0100964 A1 * | 5/2004 | Robotham | ............ | H04L 1/1858 370/394 |
| 2006/0154663 A1 * | 7/2006 | Son | ....................... | H04W 60/06 455/435.1 |
| 2007/0274267 A1 * | 11/2007 | Tiedemann, Jr. | ...... | H04B 1/707 370/335 |
| 2008/0144633 A1 * | 6/2008 | Woloszynski | ........ | H04L 1/1829 370/395.31 |

(Continued)

FOREIGN PATENT DOCUMENTS

KR 10-2011-0125481 A 11/2011
KR 10-2012-0058782 A 6/2012

(Continued)

OTHER PUBLICATIONS

Huichen Dai, Bin Liu, Yan Chen, Yi WangOn Pending Interest Table in NDN Oct. 29-30, 2012, ACM 978-1-4503-1685-Sep. 12, 2010, 214.*

*Primary Examiner* — Sai Aung
*Assistant Examiner* — Wilfred Thomas
(74) *Attorney, Agent, or Firm* — NSIP Law

(57) ABSTRACT

Provided is a communication method of a node, including receiving a first interest requesting content from a previous node in a content centric network (CCN), generating a first acknowledgment (ACK) message indicating reception of the first interest in response to receiving the first interest, and sending the first ACK message to the previous node. Provided also is a node that includes structure that is suitable to perform such a communication method.

22 Claims, 16 Drawing Sheets

(56) References Cited

U.S. PATENT DOCUMENTS

| | | | |
|---|---|---|---|
| 2009/0287835 A1* | 11/2009 | Jacobson | H04L 67/104 709/229 |
| 2010/0111029 A1* | 5/2010 | Chou | H04J 3/0682 370/329 |
| 2010/0195654 A1 | 8/2010 | Jacobson et al. | |
| 2010/0195655 A1* | 8/2010 | Jacobson | H04L 45/748 370/392 |
| 2012/0045064 A1* | 2/2012 | Rembarz | H04L 9/0822 380/281 |
| 2012/0243410 A1* | 9/2012 | Vedula | H04L 41/5025 370/235 |
| 2013/0041979 A1* | 2/2013 | Park | H04N 21/4788 709/217 |
| 2013/0060962 A1* | 3/2013 | Wang | H04L 67/327 709/238 |
| 2013/0151584 A1* | 6/2013 | Westphal | H04L 67/06 709/202 |
| 2013/0282860 A1* | 10/2013 | Zhang | H04L 45/306 709/217 |
| 2014/0019549 A1* | 1/2014 | Wei | H04M 3/567 709/204 |
| 2014/0173018 A1* | 6/2014 | Westphal | H04L 41/0823 709/213 |
| 2015/0222479 A1* | 8/2015 | Kim | H04W 28/0236 370/218 |
| 2016/0149913 A1* | 5/2016 | Eriksson | G06F 21/6218 726/6 |
| 2016/0380945 A1* | 12/2016 | Wood | H04L 51/18 709/204 |

FOREIGN PATENT DOCUMENTS

| | | |
|---|---|---|
| KR | 10-2013-0085558 A | 7/2013 |
| KR | 10-2013-0101966 A | 9/2013 |
| KR | 10-2013-0117674 A | 10/2013 |
| KR | 10-2014-0009931 A | 1/2014 |

* cited by examiner

1800

COMMUNICATION METHOD OF NODE IN CONTENT CENTRIC NETWORK (CCN) AND THE NODE

CROSS-REFERENCE TO RELATED APPLICATION(S)

This application claims the benefit under 35 USC 119(a) of Indian Patent Application No. 3541/CHE/2014 filed on Jul. 18, 2014 in the Intellectual Property Office of India, and Korean Patent Application No. 10-2015-0038852, filed on Mar. 20, 2015 in the Korean Intellectual Property Office, the entire disclosures of which are incorporated herein by reference for all purposes.

BACKGROUND

1. Field

The following description relates to a communication method of a node in a content centric network (CCN) and the node.

2. Description of Related Art

A content centric network (CCN) refers to a network topology that provides name-based routing, in-networking caching, and per-packet security features. The CCN approach has been regarded as a viable technology for peer-to-peer (P2P) content sharing, and as an alternative approach for the architecture of computer networks. Further, the CCN approach provides a new networking principle for efficient information sharing using content names that are capable of replacing host addresses of an Internet protocol (IP).

The CCN approach provides a communication network that enables a user to focus on the identity of data requested by the user rather than focusing a specific reference or a physical location of content being received.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a communication method of a node includes receiving a first Interest that requests content from a previous node in a content centric network (CCN), generating a first acknowledgment (ACK) message indicating reception of the first interest in response to receiving the first interest, and sending the first ACK message to the previous node.

The generating of the first ACK message may include generating the first ACK message using a unique sequence number associated with the first interest.

The method may further include creating a pending interest table (PIT) entry associated with the first interest in a PIT of the node after sending the first ACK message, and storing a sequence number associated with the first interest in the PIT entry.

The method may further include generating a second interest in response to an absence of content associated with the first interest being in a content store of the node, after sending the first ACK message, starting an ACK timer in response to sending the second interest to a next node, and stopping the ACK timer in response to receiving a second ACK message corresponding to the second interest from the next node.

The generating of the second interest may include generating the second interest with a nonce.

The second interest may include parameters, and the parameters may be altered based on an availability of content corresponding to the second interest in the node.

The method may further include resending the second interest to the next node in response to a failure to receive the second ACK message by expiry of the ACK timer.

The method may further include restarting the ACK timer with a backoff timeout value in response to resending the second interest.

The second interest may be associated with a unique sequence number capable of identifying the second interest, and the unique sequence number may include an IN sequence number (ISN) and an OUT sequence number (OSN).

The method may include storing the ISN in a PIT of the node in response to receiving the first interest.

The method may include storing the OSN in a PIT of the node in response to sending the second interest to the next node.

The sending of the first ACK message may include determining an incoming face through which the first interest is received as being remote or local, and sending the first ACK message in response to the first interest, in response to the incoming face being determined to be remote.

The method may further include determining a presence of a duplicate nonce generated at the previous node in the first interest, in response to the incoming face being determined to be local, and declaring the first interest as an interest resent by the previous node based on a matching between an ISN of the first interest and an ISN of an entry included in a PIT of the node, in response to the duplicate nonce being determined to be present.

The method may further include marking a PIT entry of the node using a STALE flag in response to receiving content from the next node, starting a PIT timer corresponding to the PIT entry, and removing the PIT entry from a PIT of the node in response to expiry of the PIT timer.

A value of the PIT timer may be calculated based on a round trip time (RTT) of the node.

In another general aspect, a non-transitory computer-readable storage medium stores a program for causing a processor to perform the above method.

In another general aspect, a node includes a receiver configured to receive a first interest requesting content from a previous node in a content centric network (CCN), a processor configured to generate a first acknowledgment (ACK) message indicating reception of the first interest in response to receiving the first interest, and a sender configured to send the first ACK message to the previous node.

The node may further include a pending interest table (PIT) comprising PIT entries, wherein the processor is configured to create a PIT entry associated with the first interest in the PIT, and to store a sequence number associated with the first interest in the PIT entry.

The node may further include a content store configured to store content, wherein the processor is configured to generate a second interest and to send the second interest to a next node in response to an absence of content associated with the first interest being in the content store, after the sender sends the first ACK message.

The processor may be configured to start an ACK timer in response to generating the second interest and sending the second interest to the next node, and to stop the ACK timer in response to receiving a second ACK message corresponding to the second interest from the next node.

The processor may be configured to resend the second interest to the next node in response to a failure in receiving the second ACK message by expiry of the ACK timer, and to restart the ACK timer with a backoff timeout value.

The processor may be configured to mark a PIT entry of the node using a STALE flag in response to receiving content from the next node, to start a PIT timer corresponding to the PIT entry, and to remove the PIT entry from a PIT of the node in response to expiry of the PIT timer.

In another general aspect, a communication method of a node includes generating a first acknowledgment (ACK) message indicating reception of a first interest that requests content from a previous node in a content centric network (CCN) in response to receiving the first interest, and sending the first ACK message to the previous node.

The generating of the first ACK message may include generating the first ACK message using a unique sequence number associated with the first interest.

The method may further include creating a pending interest table (PIT) entry associated with the first interest in a PIT of the node after sending the first ACK message, and storing a sequence number associated with the first interest in the PIT entry.

The method may further include generating a second interest in response to an absence of content associated with the first interest being in a content store of the node, after sending the first ACK message, starting an ACK timer in response to sending the second interest to a next node, and stopping the ACK timer in response to receiving a second ACK message corresponding to the second interest from the next node.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
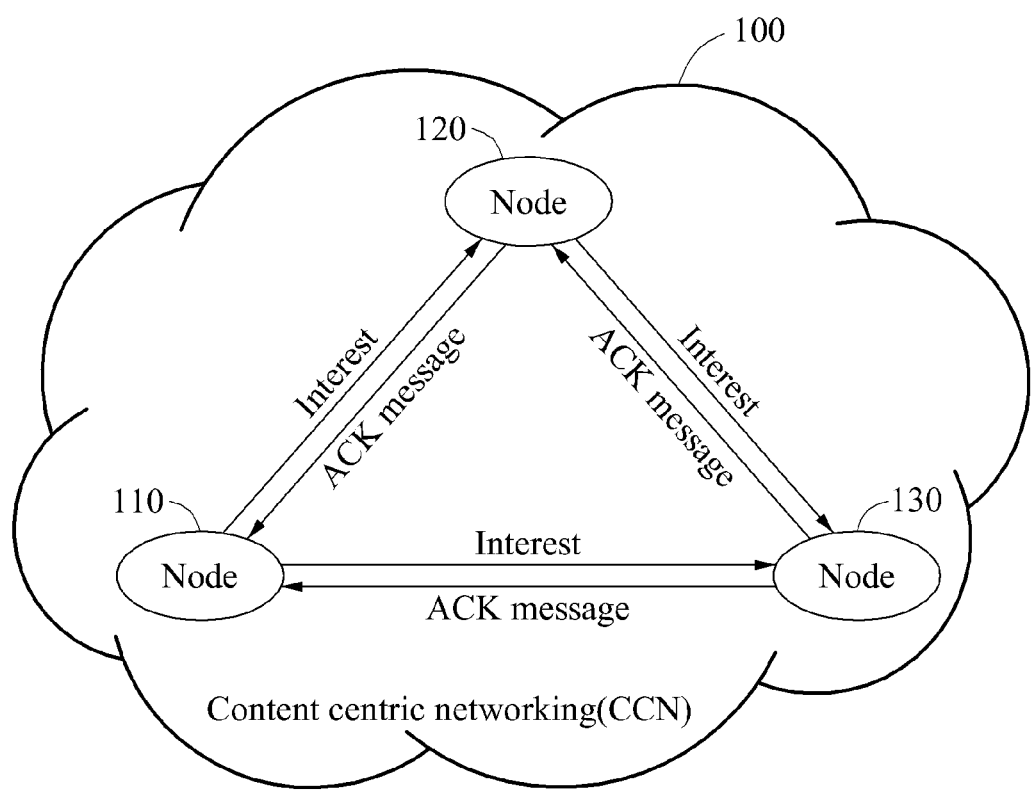
FIG. 1 is a diagram illustrating an example of an architecture of a content centric network (CCN).

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, examples are described with reference to the accompanying drawings. Like reference numerals are used to refer to like constituent elements throughout.

Various modifications may be made to the examples. The examples are not provided to be limiting and are intended to be understood to include all the changes, alterations, equivalents, and replacements thereof.

The terminology used herein is for the purpose of describing particular examples only and is not intended to be limiting. As used herein, the singular forms "a," "an" and "the" are intended to include the plural forms as well, unless the context clearly indicates otherwise. It is further understood that the terms "include" and/or "have," when used in this specification, are intended to specify the presence of stated features, integers, steps, operations, elements, components or combinations thereof, but are not intended to preclude the presence or addition of one or more other features, integers, steps, operations, elements, components, and/or groups thereof.

Unless otherwise defined, all terms including technical and scientific terms used herein are intended to have the same meaning as is commonly understood by one of ordinary skill in the art to which these examples pertain. It is intended to be further understood that terms, such as those defined in commonly used dictionaries, are to be interpreted as having a meaning that is consistent with their meaning in the context of the relevant art and are not to be interpreted in an idealized or overly formal sense unless expressly so defined herein.

Further, when describing the examples with reference to the accompanying drawings, like reference numerals are assigned to like constituent elements throughout and iterative descriptions related thereto are omitted here for brevity. When it is determined that a detailed description related to a known function or configuration is likely to render the purpose or clarity of the present disclosure unnecessarily ambiguous, the detailed description is omitted here to preserve clarity.

Hereinafter, a content centric network (CCN) is briefly described prior to describing further the architecture of the CCN.

In a CCN, a request packet is known as an interest and a reply packet is known as content or a content object. The content is divided into chunks of appropriate sizes and each interest requests a chunk. Thus, it is possible to request and reply packets appropriately to exchange information.

A node requesting the content sends a plurality of interests in a sequential manner. Here, each interest is associated with a content, which allows retrieval of the relevant contents for the node.

In the CCN, for every interest, at most one content is received. Further, the sent interest is propagated towards a content source by applying a suitable name-based routing technique to fulfill the interest.

Each intermediate node of the CCN, on receiving the interest, verifies whether an interest for content present in a content cache, known as a content store (CS), is received.

When the requested content is found in the content store, a node responds with the content to respond to the interest with its corresponding content. Otherwise, the node forwards the interest to a next node or an adjacent node of the CCN.

Before forwarding the interest, the intermediate node stores interest information in an interest table known as a Pending Interest Table (PIT). A PIT is used to help manage information used for fulfilling interests.

Forwarding information is either populated manually or through a suitable routing technique and is stored in a Forwarding Information Base (FIB) table.

A node including the content replies to the node, also referred to as a requesting node, requests the content using a reserve path formed by PIT entries created at intermediate nodes. When the content is present within the node, the PIT entries are removed at the intermediate nodes including end nodes. As a result, the content is then provided.

Instead of using an inefficient method of sending a single interest at a time, a plurality of requests is aggregated to form a single interest.

An interest requests one or more contents monitored by a dynamically changing entity known as a window size of the interest. An interest with a window size 'w_max' is sent to a node in the CCN to receive the contents associated with the interest. Here, 'w_max'' denotes a predetermined maximum value used to specify a window size when transferring information through the CCN.

When a content sender receives the interest, the content sender reads the window size of the interest and sends the content to the requesting node. Further, interest information associated with the interest includes a segment start range.

A first missing content is considered to be a point at which a new interest is to be constructed and sent to a next node. In this manner, the window size of the interest is reduced at each node based on the availability of the content at each node. Hence, as the content is fulfilled to satisfy the interest, progressively less and less information remains to be transmitted.

When an interest is dropped at any of nodes in the CCN, a content recovery time at the requesting node potentially increases. Accordingly, it is helpful to ensure a reliable delivery of an interest to each node having content corresponding to the interest for obtaining the content at a requester node, to maximize efficiency and performance. Accordingly, the drop of the interest at any of intermediate nodes in the CCN affects the throughput at the requester node.

FIG. 1 illustrates an example of an architecture of a CCN.

Referring to FIG. 1, the CCN 100 includes an initial node 110 and a plurality of nodes, for example, a second node 120 and a third node 130. The initial node 110 is also referred to as a CCN client, because it is a consumer of content that are sent in response to an interest that it initiates.

In an example, the term "node" indicates any type of communication devices, including as examples, a mobile device and an access point, that are capable of sending an interest packet and receiving content in a CCN, and a node is to be understood as having a meaning including all of an initial node, a CCN client, an interest owner, and an intermediate node.

The initial node 110 sends an interest requesting content to an adjacent node, for example, the second node 120. The term "interest" is to be understood as a packet requesting the content.

The interest includes parameters that include, for example, the number of requests and a request start segment number, however, is not limited thereto, and the interest optionally includes other information about what information is requested in addition to or in lieu of these named examples of parameters.

In response to the interest received from the initial node 110, the second node 120 sends an acknowledgement (ACK) message to the initial node 110. Subsequently, in this example, the interest is sent from the second node 120 to the third node 130 as part of attempting to fulfill the interest.

However, the interest is potentially altered before being sending to adjacent nodes. In the example of FIG. 1, the adjacent nodes of the initial node 110 are the second node 120 and the third node 130. Here, parameters included in an interest to be sent to each node are altered based on the availability of content associated with at least one request in the interest, such that the parameters change so as to be responsive to whether the content is present at a node or if the content is to be obtained elsewhere in the CCN.

In an example, the initial node 110 generates an interest, and sends the generated interest to the second node 120. When the second node 120 receives the interest in the CCN, the second node 120 immediately sends an ACK message before processing the received interest. Similarly, when the third node 130 receives an interest from the initial node 110 or the second node 120, the third node 130 immediately sends an ACK message to the initial node 110 or the second node 120, depending on from which node it received the interest.

The term "interest owner", as used herein, indicates a node that sends an interest to an adjacent node in the CCN. Accordingly, each node that sends the interest in the CCN is to be understood as the interest owner in the following context. However, sometimes the node is the original source of the interest and sometimes the node is merely forwarding an interest that it previously received.

In an example, each node including the interest owner maintains an ACK timer for ensuring a reliable delivery of an interest in the CCN. The interest owner initializes the ACK timer after sending the interest to another node or nodes. The use of the ACK timer is now discussed further.

The interest owner receives an ACK message from the node that receives the interest, in response to the interest. The ACK message acts as an acknowledgment that the interest has been received. When the ACK message is received, the ACK timer is stopped at the interest owner. Unless the ACK message is received at the node having sent the interest by the expiry of the ACK timer, the interest owner resends the interest to the node. Thus, this process acts as a countdown in which a time interval is provided for the interest to be acknowledged, and if the interest is not acknowledged, the interest is resent to ensure that it is fulfilled.

In an example, the interest owner generates an interest and sends the generated interest to a next node. When a node receives an interest in the CCN, the node immediately sends the ACK message before processing the interest. Thus, the ACK message stops the ACK timer as discussed because it is an indicator that the interest has successfully been transmitted and there is no need to resend the interest. Similarly, when the adjacent node receives the interest, the adjacent node also immediately sends the ACK message. As described above, in an example, it is possible to ensure a reliable delivery of an interest by performing an ACK mechanism in which each node included in the CCN provides an ACK message with respect to all of the sent interests, and thus guarantees that the interests will eventually be acknowledged.

The disclosed ACK mechanism of examples is performed in a similar manner to a general ACK mechanism in the case when no interests are dropped. Conversely, in the case when interests are dropped, the disclosed ACK mechanism of examples significantly enhances a throughput compared to the general ACK mechanism.

Compared to a request ACK mechanism of a transport control protocol (TCP), which is an alternative for ensuring that packet transmission is guaranteed through the ACK mechanism, the disclosed ACK mechanism has the following differences.

In the TCP approach, the ACK mechanism acknowledges content reception and requests new content. The disclosed ACK mechanism, however, ensures the delivery of an interest to a next node in the CCN, but the disclosed ACK mechanism does not have any correspondence to the content itself.

In the TCP, an ACK sequence number is used to identify a next requested segment number in terms of bytes. However, in the disclosed ACK mechanism, a sequence number is used to distinguish two similar interests from each other.

Additionally, the TCP approach uses only one sequence, but the disclosed ACK mechanism uses an IN sequence number (ISN) and an OUT sequence number (OSN) for its operation. Furthermore, there is no concept of a PIT in the TCP approach and a PIT timer is absent in the TCP approach. Due to these differences, the disclosed ACK mechanism provides improved features, as disclosed further below.

Figure 2:
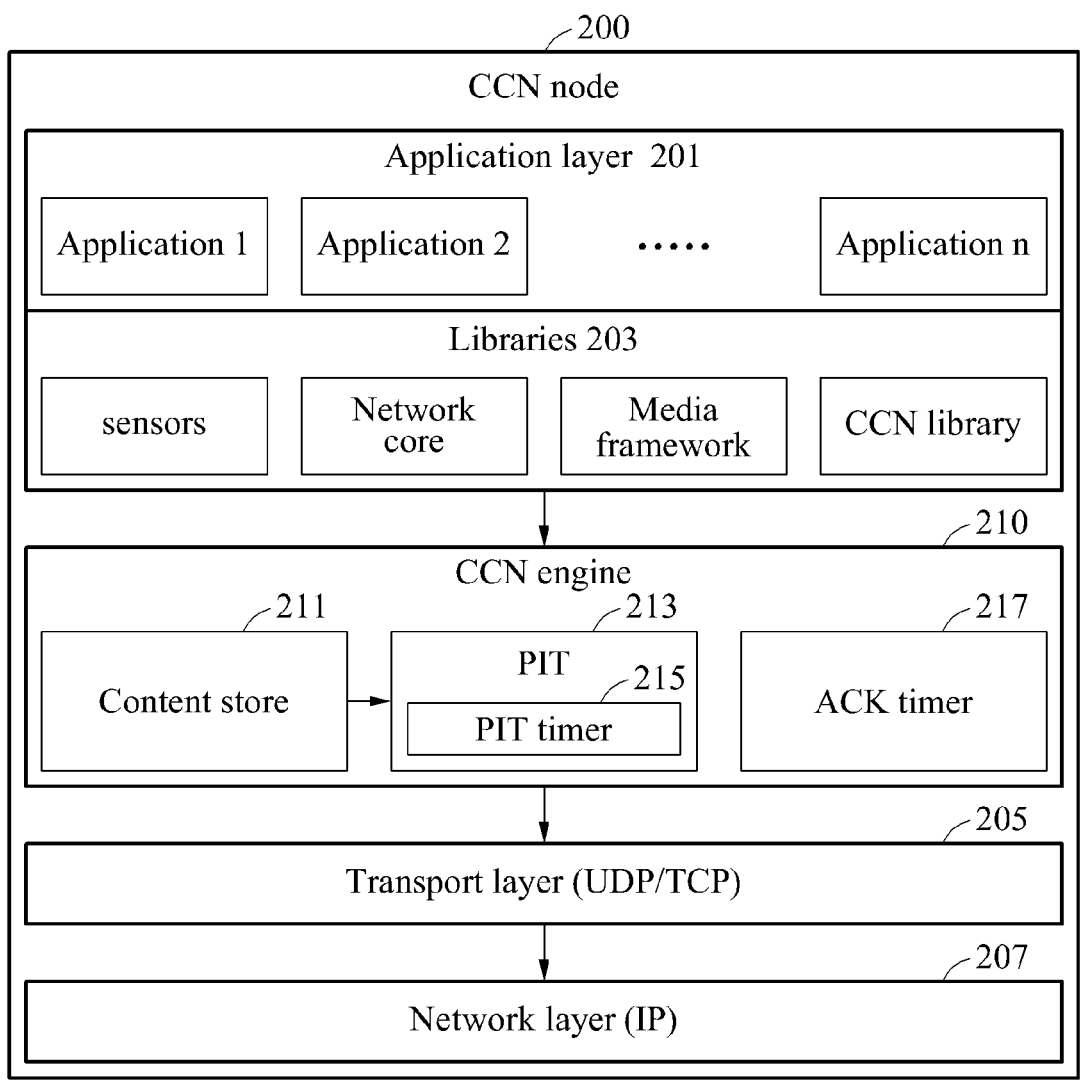
FIG. 2 is a block diagram illustrating an example of a node in a CCN.

FIG. 2 is a block diagram illustrating an example of a node in a CCN.

Referring to the example of FIG. 2, the node 200 in the CCN includes an application layer 201 including a plurality of application programs, for example, application program 1 through application program n, present in the node 200. For example, the node 200 is one of the initial node 110, the second node 120, and the third node 130, as presented in the example of FIG. 1. In an example, the application program is a browser installed in the node 200.

The node 200 of the CCN includes libraries 203 that include, for example, sensors, a network core, a media framework, and a CCN library. However, the libraries 203 are not limited thereto and other examples are potentially used instead of or in addition to these sample libraries 203.

The node 200 also includes a CCN engine 210.

In the example of FIG. 2, the CCN engine 210 includes a content store (CS) 211, a PIT 213, and an ACK timer 217.

During operation of the CCN, the node 200 sends an interest with at least one request corresponding to content. Thus, the interest is used to retrieve content for the node 200.

The sent interest is propagated towards a content source by applying a suitable name-based routing technique. By such propagation, the content is retrieved in an efficient and effective manner.

Each intermediate node, on receiving the interest, verifies if the interest corresponds to content present in its own content store 211, that is also referred to as a content cache. When the requested content is found in its content store 211, the node 200 responds with the found content. Otherwise, the node 200 forwards the interest to a next node or an adjacent node, so that the interest is propagated until a node is able to satisfy the interest with appropriate content.

Before forwarding the interest, the node 200 stores interest information in an interest table known as the PIT 213. The interest information stored in the PIT 213 helps manage the exchange of interests and ensure that interests will be fulfilled.

The PIT 213 includes a PIT timer 215. The PIT timer 215 is started when the content is received at the node 200.

In an example, an entry of the PIT 213 is deleted from the PIT 213 upon the expiration of the PIT timer 215. Such deletion ensures that the PIT only stores entries for a time period during which they are relevant.

Further, the CCN engine 210 sends the interest to a network layer 207 through a transport layer 205. The transport layer 205 uses, for example, a user datagram protocol (UDP) or a TCP. The network layer 207 uses an IP. Thus, the CCN engine is able to manage the transmission of an interest using a CCN approach by mediating the transmission of the interest appropriately by involving other technologies at the transport layer 205 level and the network layer 207 level.

Figure 3:
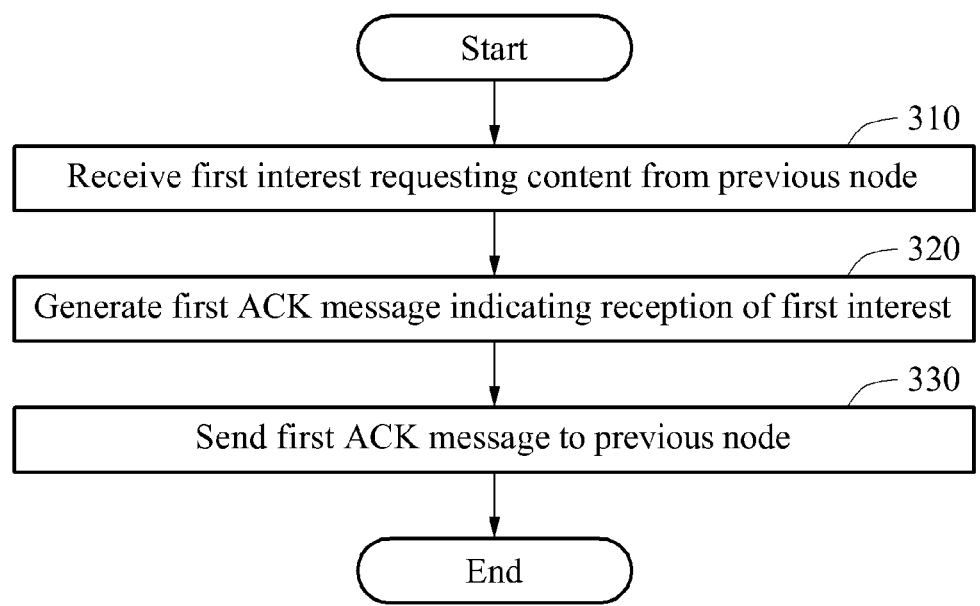
FIG. 3 is a flowchart illustrating an example of a communication method of a node.

FIG. 3 is a flowchart illustrating an example of a communication method of a node.

Referring to FIG. 3, in operation 310, the method receives a first interest requesting content from a previous node in a CCN. For example, the node receives a first interest requesting content from a previous node in a CCN.

Here, the first interest is associated with a unique sequence number capable of identifying the first interest. In an example, the unique sequence number includes an IN sequence number (ISN) and an OUT sequence number (OSN).

When the first node is received, the node stores the ISN in a PIT of the node. Thus, a correspondence is established for the incoming interest.

In operation 320, the method node generates a first ACK message indicating reception of the first interest in response to the first interest. For example, the node generates a first ACK message indicating reception of the first interest in response to the first interest. Here, the node generates the first ACK message based on the unique sequence number associated with the first interest, so that it is clear which ACK message corresponds to which interest.

In operation 330, the method sends the first ACK message to a previous node. For example, the node sends the first ACK message to a previous node. Here, the node sends the first ACK message before processing the first interest. As discussed, the first ACK is associated with a sequence number corresponding to a unique identifier of the first interest. The sequence number of the first interest is chosen to match the first ACK message by having the same value to indicate that the first ACK message corresponds to the first interest.

Figure 4:
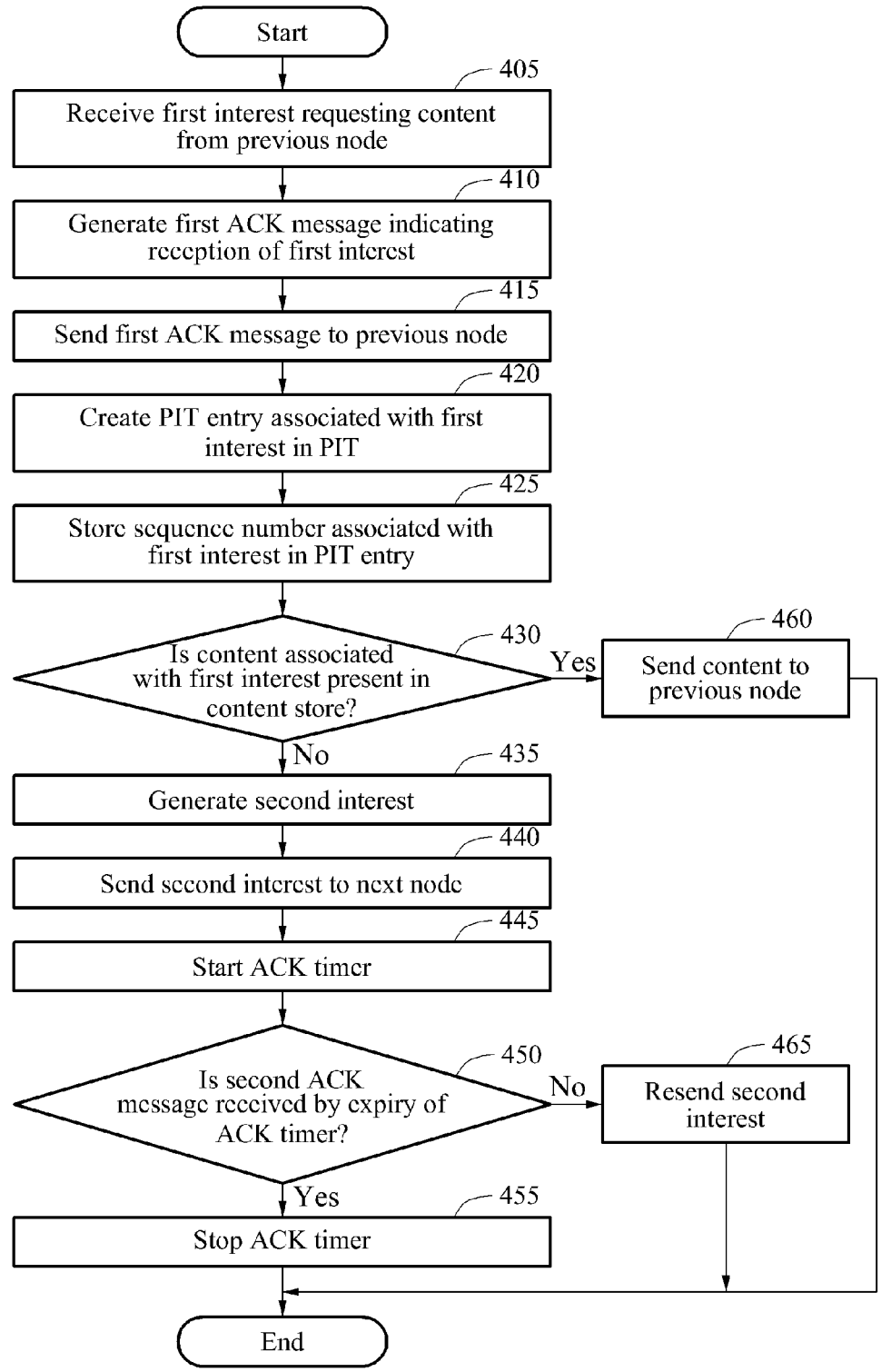
FIG. 4 is a flowchart illustrating another example of a communication method of a node.

FIG. 4 is a flowchart illustrating another example of a communication method of a node.

Referring to the example of FIG. 4, in operation 405, the method receives a first interest requesting content from a previous node in a CCN. For example, the node receives a first interest requesting content from a previous node in a CCN.

In operation 410, the method generates a first ACK message indicating reception of the first interest in response to the first interest. For example, the node generates a first ACK message indicating reception of the first interest in response to the first interest.

In operation 415, the method sends the first ACK message to the previous node. For example, the node sends the first ACK message to the previous node.

In operation 420, the method creates a PIT entry associated with the first interest in a PIT of the node. For example, the node creates a PIT entry associated with the first interest in a PIT of the node.

In operation 425, the method stores a sequence number associated with the first interest in the PIT entry. For example, the node stores a sequence number associated with the first interest in the PIT entry.

In operation 430, the method determines whether content associated with the first interest is present in a content store of the node. For example, the node determines whether content associated with the first interest is present in a content store of the node.

However, when the content associated with the first interest is determined to be present in the content store of the node in operation 430, in operation 460 the method sends the content to the previous node. For example, the node sends the content to the previous node.

Conversely, when the content associated with the first interest is determined to be absent in the content store of the node in operation 430, in operation 435 the method generates a second interest in operation 435. For example, the node generates a second interest. In an example, the second interest requests the same content as requested by the first interest. Values of a portion of parameters included in the first interest are altered by the node and are then applied to the second interest. Thus, the second interest includes parameters, and the parameters are altered based on the availability of the content corresponding to the second interest.

In an example, the second interest is also associated with a unique sequence number capable of identifying the second interest and the unique sequence number optionally includes an ISN and an OSN. The node generates the second interest with nonce. For example, a nonce is an arbitrary number used only once in cryptographic communication, such as for authentication purposes.

In operation 440, the method sends the generated second interest to a next node. For example, the node sends the generated second interest to a next node. When sending the second interest to the next node, the node stores the OSN in the PIT of the node.

In operation 445, the method starts an ACK timer in response to sending the second interest to the next node. For example, the node starts an ACK timer in response to sending the second interest to the next node. In such an example, the node starts the ACK timer at the same time of sending the second interest. The ACK timer is used to ensure a reliable delivery of the second interest.

In operation 450, the method determines whether a second ACK message is received by expiry of the ACK timer. For example, the node determines whether a second ACK message is received by expiry of the ACK timer. The second ACK message has as its purpose and role to respond to the second interest.

When the second ACK message is determined to have been received by the expiry of the ACK timer in operation 450, in operation 455 the method stops the ACK timer. For example, the node stops the ACK timer.

Conversely, when the second ACK message is determined to have not been received by the expiry of the ACK timer in operation 450, in operation 465 the method resends the second interest to the next node. For example, the node resends the second interest to the next node. When resending the second interest in operation 465, the node restarts the ACK timer with a predetermined backoff timeout value.

Figure 5:
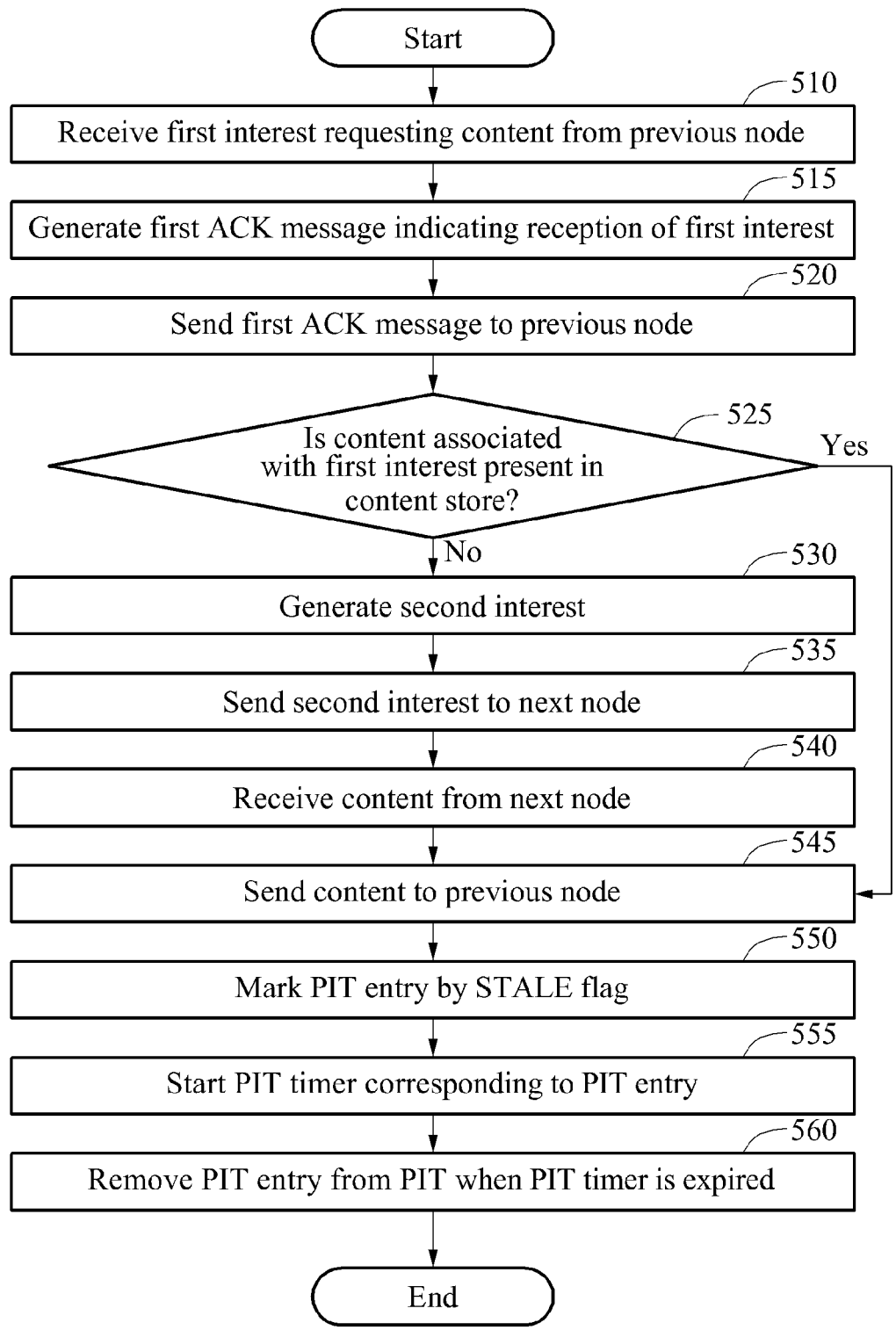
FIG. 5 is a flowchart illustrating still another example of a communication method of a node.

FIG. 5 is a flowchart illustrating still another example of a communication method of a node.

Referring to FIG. 5, in operation 510, the method receives a first interest requesting content from a previous node in a CCN. For example, the node receives a first interest requesting content from a previous node in a CCN.

In operation 515, the method generates a first ACK message indicating reception of the first interest, in response to the first interest. For example, the node generates a first ACK message indicating reception of the first interest, in response to the first interest.

In operation 520, the method the node sends the first ACK message to the previous node. For example, the node sends the first ACK message to the previous node.

In operation 525, the method determines whether content associated with the first interest is present in a content store of the node. For example, the node determines whether content associated with the first interest is present in a content store of the node.

When the content associated with the first interest is determined to be present in the content store of the node in operation 525, in operation 545, the method sends the content to the previous node. For example, the node sends the content to the previous node.

Conversely, when the content associated with the first interest is determined to be absent in the content store of the node in operation 525, in operation 530, the method generates a second interest. For example, the node generates a second interest.

In operation 535, the method sends the second interest to the next node. For example, the node sends the second interest to the next node.

In operation 540, the method receives content from the next node. For example, the node receives content from the next node. Here, the content corresponds to the second interest. In this example, "corresponds to" is intended to be understood as signifying that the content corresponds to the content requested through the second interest.

In operation 545, the method sends the received content to the previous node that requested sending of the content through the first interest. For example, the node sends the received content to the previous node that requested sending of the content through the first interest.

In operation 550, the method marks a PIT entry of the node by a STALE flag. For example, the node marks a PIT entry of the node by a STALE flag. In this example, the PIT entry corresponds to the content sent in operation 545. Further, the STALE flag indicates the PIT entry corresponding to the content received in response to an interest. Accordingly, in an example the PIT entry marked by the STALE flag is removed from a PIT after a predetermined period of time is elapsed.

In operation 555, the method starts a PIT timer corresponding to the PIT entry. For example, the node starts a PIT timer corresponding to the PIT entry.

When the PIT timer started in operation 555 expires, in operation 560 the method removes the PIT entry from the PIT of the node. For example, the node removes the PIT entry from the PIT of the node.

For example, when an ACK message sent from a node in response to an interest is dropped due to network congestion irrespective of the interest having normally reached the node, a counterpart node that failed in receiving the ACK message resends the interest. In this example, in general, the node sends content requested by the previously sent interest. The node also immediately deletes a PIT entry corresponding to the sent content from a PIT of the node.

In this example, the node receives an ACK message for the interest resent from the counterpart node and content associated with the resent interest from another node. However, in such an example, the PIT entry matching the content has already been removed from the PIT of the node and thus, the node cannot find a matching PIT entry in the PIT. As a result, the node drops the sent content.

To avoid the above situation, which causes problems in data transmission, a PIT timer is maintained at each of nodes of the CCN. Thus, instead of immediately deleting the PIT entry from the PIT upon receiving the content, the node starts the PIT timer and removes the PIT entry corresponding to the PIT upon expiry of the PIT timer. Thus, in such an example, it is possible to reduce the waste of a link between nodes by resending of unnecessary duplicate content, because use of the PIT timer provides a time interval to verify that it is necessary to resend the content.

Figure 6:
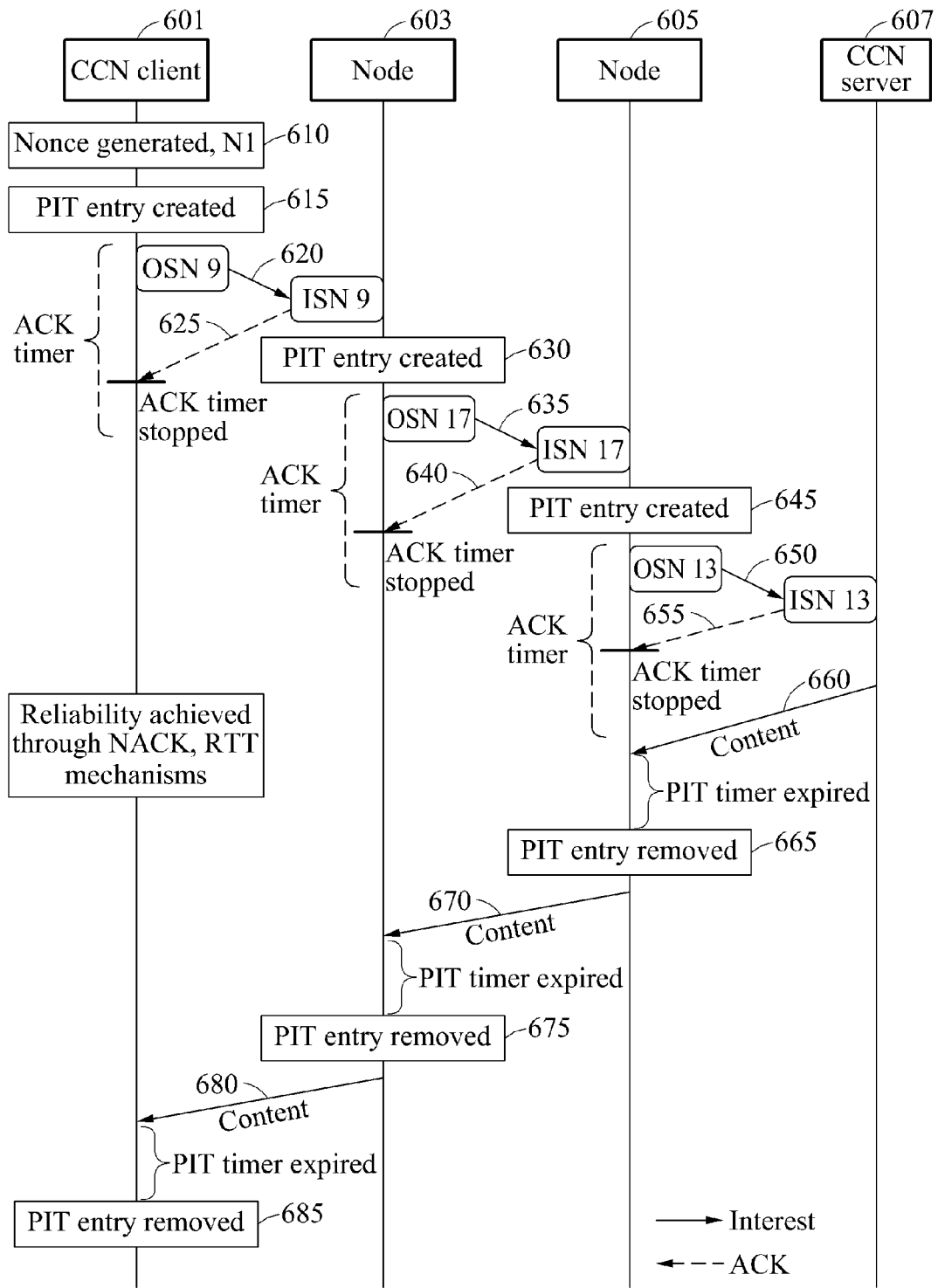
FIG. 6 illustrates an example of a process of maintaining an acknowledgement (ACK) timer and a propagating interest table (PIT) timer at each node to ensure the delivery of an interest in a CCN.

FIG. 6 illustrates an example of a process of maintaining an ACK timer and a PIT timer at each node to ensure the delivery of an interest in a CCN.

In an example, each node in the CCN provides an ACK message in response to receiving an interest. Thus, the reliable delivery of interests is ensured. The ACK message or an ACK packet is a type of CCN content with its type field set to 'CCN_ACK'. This type field setting indicates that the content is intended to operate as an acknowledgement. The presence of information, for example, a payload, as part of the ACK message is optional.

Referring to the example of FIG. 6, in operation 610, a CCN client 601 generates an interest with nonce N1. As discussed above, a nonce is a single-use numerical value used for authentication. In general, the nonce is generated at the CCN client 601 to ensure that the interest is not received again at the CCN client 601.

In operation 615, the CCN client 601 creates a PIT entry associated with the CCN client 601. In an example, the interest generated at the CCN client 601 is associated with an OSN. The OSN indicates a sequence number of an outgoing interest from the node. The OSN is a randomly generated number, for example, '9'. In various examples, the OSN may be required to be in a certain range. The OSN is either randomly generated or generated based on a predetermined algorithm executed at the node.

In the example of FIG. 6, the OSN of the interest sent from the CCN client 601 is '9', which is modified at each node based on the availability of content at each node in the CCN.

In operation 620, the CCN client 601 sends the interest to a node 603.

The CCN client 601 then starts an ACK timer of the CCN client 601, after sending the interest to the node 603.

When the node 603 receives the interest, the node 603 immediately sends an ACK message before processing the interest in operation 625. When the ACK message is received from the node 603, the ACK timer of the CCN client 601 is stopped.

Similarly, when a node 605 receives the interest, the node 605 immediately sends the ACK message. In an example, the interest is associated with a unique sequence number that is capable of uniquely identifying the interest sent from the CCN client 601 to the node 605. Hence, the sequence number is unique for every node pair located along an interest path, as providing a unique sequence number for every node pair helps to facilitate the ability to identify the interest.

When the ACK message is received from the node 603, the CCN client 601 searches a PIT of the CCN client 601, where the PIT is to be matched with an OSN. In this example, the CCN client 601 searches the PIT of the CCN client 601 before confirming that the node 603 has received the interest sent from the CCN client 601.

When the node 603 receives the interest, the node 603 creates a PIT entry so that the ISN '9' that was associated with the interest is then stored in a PIT of the node 603. The ISN is randomly generated as, for example, '9', or is generated based on a predetermined logic executed at a node, in a manner similar to the generation of the OSN.

In operation 635, the node 603 sends the interest to the node 605 after processing the interest received from the CCN client 601. According to an interest processing method according to an example, the node 603 verifies whether available content associated with the interest received from the CCN client 601 is present in a content store of the node 603. When the content associated with the interest is present in the content store of the node 603, the node 603 sends the content associated with the interest to the CCN client 601. Thus, in this situation the node 603 fulfills the information requested through use of the interest. The sequence number of the interest is stored in the PIT of the node 603 as OSN '17' at the node 603 before sending the interest to the node 605.

In an example, the node 605 generates the ACK message to acknowledge receipt of the interest sent from the node 603, and sends the ACK message to the node 603 in operation 640. The ACK message is generated at the node 605, based on the sequence number associated with the interest. By using the sequence number, the ACK message is able to identify the interest to which it pertains.

In an example, the ACK timer is started when each node forwards an interest to a neighboring node, for example, the node 603 or the node 605, as discussed. Further, the ACK message is to be received at any of the nodes before the ACK timer is expired. Unless the ACK message is received before the expiry of the ACK timer, the node resends the interest. As discussed, this mechanism helps ensure that the interest propagates successfully. The ACK timer of the node having resent the interest is restarted with a predetermined backoff timeout value when resending the interest, so that there is provided a new opportunity to receive an ACK message.

As illustrated in FIG. 6, each of the CCN client 601, the node 603, and the node 605 starts its ACK timer at the same time at which the interest is forwarded to a next node, for example, an adjacent node. However, when the ACK message is received at each node before the expiry of the ACK timer, each node does not resend the interest, because the receipt of the ACK message indicates that there is no need to resend the interest.

When the interest is received from the node 603, the node 605 creates a corresponding entry of the interest in a PIT of the node 605 as ISN '17', and starts processing the interest accordingly in operation 645.

In operation 650, the node 605 processes the interest and then changes the OSN of the interest to '13' and sends the interest to a CCN server 607.

In operation 655, in response to the interest previously received from the node 605, the CCN server 607 sends an ACK message acknowledging the reception of the interest to the node 605. After sending the ACK message, the CCN server 607 starts processing the interest.

In operation 660, after processing the interest, the CCN server 607 sends content matched to the interest to the node 605. In an example, when the node 605 receives the content from the CCN server 607, the node 605 marks a corresponding PIT entry with a STALE flag. The node 605 then initializes the PIT timer. Requirements for initializing a PIT timer of a node upon receiving content matched with an interest are described further with reference to FIG. 7.

When the PIT timer has expired, the node 605 removes the corresponding PIT entry from the PIT of the node 605 in operation 665.

In operation 670, the content received from the CCN server 607 is cached at the node 605, and the node 605 also sends the content to the node 603.

When the content is received, the node 603 removes the corresponding PIT entry from the PIT of the node 603 after the PIT timer of the node 603 has expired in operation 675. Also, the node 603 initializes again the PIT timer.

In operation 680, the node 603 caches the content received from the node 605 and then sends the cached content to the CCN client 601.

When the PIT timer of the CCN client 601 has expired after receiving the content from the node 603, the CCN client 601 removes the corresponding PIT entry from the PIT of the CCN client 601 in operation 685. Also at this point, the CCN client 601 initializes again the PIT timer.

Figure 7:
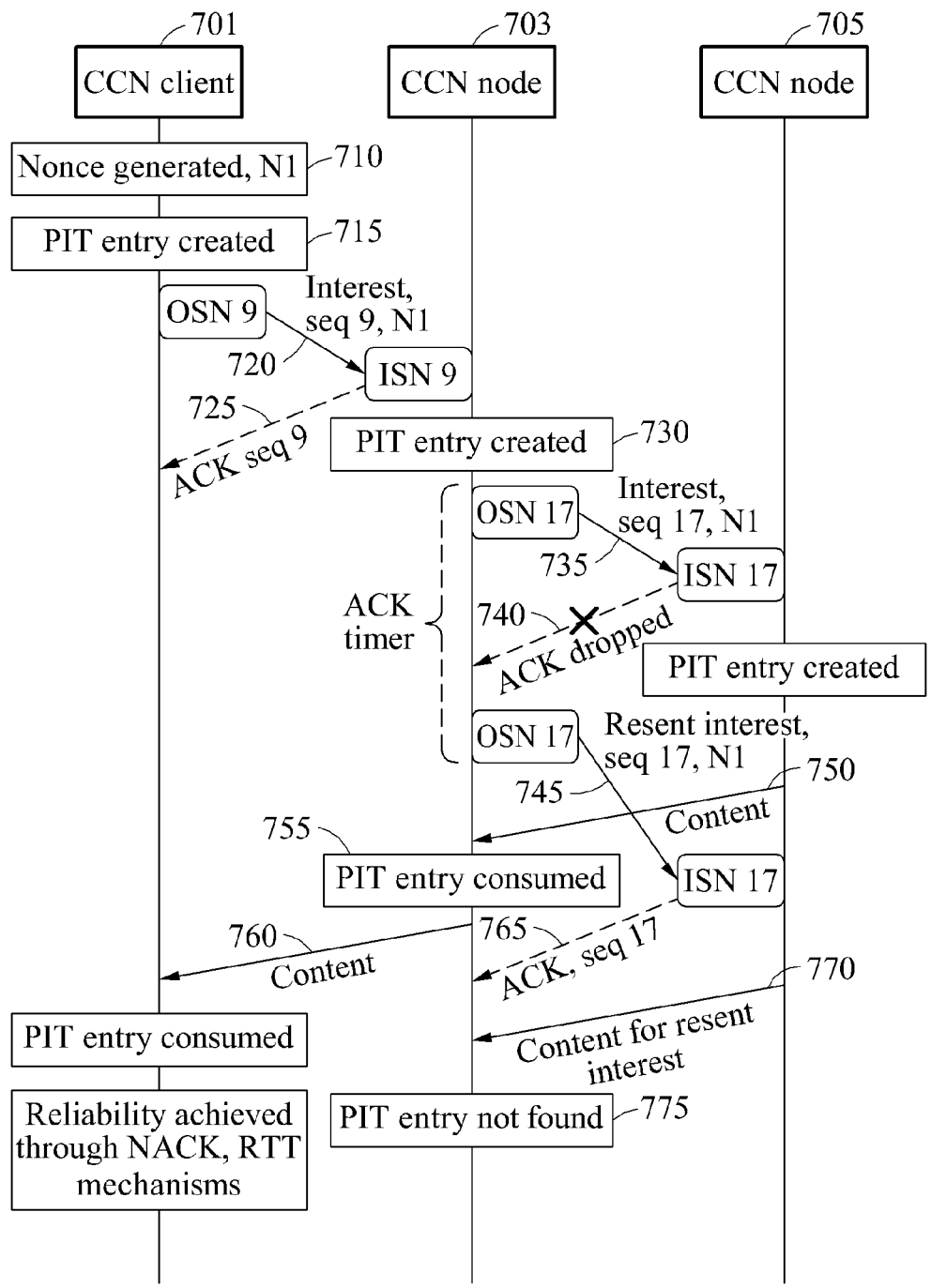
FIG. 7 illustrates an example of an operation when an ACK packet is dropped between nodes in a CCN.

FIG. 7 illustrates an example of an operation when an ACK packet is dropped between nodes in a CCN.

Referring to the example of FIG. 7, a CCN client 701, also known as an interest owner, generates an interest with nonce N1, as discussed, in operation 710 and creates a PIT entry of the CCN client 701 in operation 715.

In such an example, the interest generated at the CCN client 701 is associated with an OSN. The OSN of the interest is, for example, '9'. The OSN of the interest is modified at each node based on the availability of content at each node in the CCN, to help control interest propagation in a way that ensures that interests are fulfilled efficiently.

In operation 720, the CCN client 701 sends the interest to a node 703. The CCN client 701 initializes an ACK timer after sending the interest to the node 703. The node 703 then receives the interest with the OSN as '9' from the CCN client 701. An ISN of the interest received at the node 703 is, for example, '9', so as to correspond to the OSN.

In operation 725, the node 703 immediately sends an ACK message to the CCN client 701 before processing the interest received from the CCN client 701. For example, the ACK timer of the CCN client 701 is stopped after receiving the ACK message from the node 703.

When the interest is received from the CCN client 701, the node 703 creates an entry in a PIT of the node 703 in operation 730. For example, the node 703 creates the entry in the PIT and stores ISN '9' in the PIT as a sequence number associated with the interest.

In operation 735, the node 703 sends the interest to the node 705 after processing the interest received from the CCN client 701. In this example, the sequence number of the interest sent from the node 703 to the node 705 is stored in the PIT of the node 703 as OSN '17'. Further, the ISN of the interest received at the node 705 is '17'. Hence, it can be seen that the OSN and ISN correspond to one another.

The node 705 that has received the interest from the node 703 generates an ACK message acknowledging reception of the interest and then sends the ACK message to the node 703. In operation 740, the ACK message is dropped between the nodes 703 and 705. For example, the dropping of the ACK message is due to network congestion, though other examples provide that other reasons instead of or in addition to network congestion cause the dropping of the ACK message.

When the ACK message sent from the node 705 is dropped between the nodes 703 and 705 in operation 740, the node 703 resends the interest with the OSN '17' after the expiry of the ACK timer of the node 703 in operation 745. The ISN of the interest resent to the node 705 is '17'. Hence, the resending ensures that the dropped ACK message is resent and transmission is successful.

In operation 750, the node 703 receives the content from the node 705 after resending the interest upon the expiry of the ACK timer.

Due to the resending of the interest in operation 745 and the interest resulting in receiving duplicate content from the node 705 in operation 750, a new PIT entry is created at the node 705 at this point.

In FIG. 7, the ACK message sent from the node 705 to the node 703 after the node 703 sends the interest to the node 705 is dropped due to, for example, network congestion. As discussed previously, in other examples, other causes may lead to the interest being dropped. However, in this example, the node 703 waits to receive the ACK message until the ACK timer of the node 703 has expired. Unless the ACK message is received by the expiry of the ACK timer, the node 703 resends the interest to the node 705. In operation 750, the content matching the previously sent interest, that is, the interest sent in operation 745, is received at the node 703.

When the matching PIT entry for the received content is found in the PIT of the node 703 in operation 750, the PIT entry is removed by the node 703 in operation 755. Also, the content is forwarded from the node 703 to the CCN client 701 in operation 760.

When the PIT entry of the node 703 is removed in operation 755, the node 703 then receives the ACK message for the resent interest in operation 765.

In operation 770, the content associated with the resent interest, sent from the node 705, arrives at the node 703.

Since the PIT entry matching the received content is removed from the PIT of the node 703 in operation 755, the matching PIT entry is not found at the node 703 and hence the content is dropped in operation 775. During this process, a link between the nodes 703 and 705 is potentially wasted by resending unnecessary duplicate content.

In an example, to avoid such a situation, a PIT timer is maintained at each node, for example, the CCN client 701, the node 703, and the node 705 in the CCN.

Instead of immediately deleting the PIT entry upon reception of content, each node starts a PIT timer and removes a corresponding PIT entry from a PIT, upon expiry of the PIT timer. In an example, a value of the PIT timer is dynamically calculated based on round trip time (RRT) estimation at each node. However, other appropriate techniques are used to estimate the value of the PIT time in other examples.

In an example, when content is received, a PIT entry corresponding to the received content is marked with a CCN_PR_STALE flag. For a normal operation, only PIT entries not having a CCN_PR_STALE flag set are used at each node.

When an interest is received at a node and content corresponding to the interest is found in a content store within the node, the node does not create a PIT entry corresponding to the interest.

As described above, when the interest is resent since an ACK message is not received at a node due to, for example, network congestion, such a situation potentially causes duplicate content to be sent. In this case, the node creates a PIT entry. Thus, the PIT entry is marked as a CCN_PR_STALE flag and subsequently removed after expiry of a PIT timer.

Figure 8:
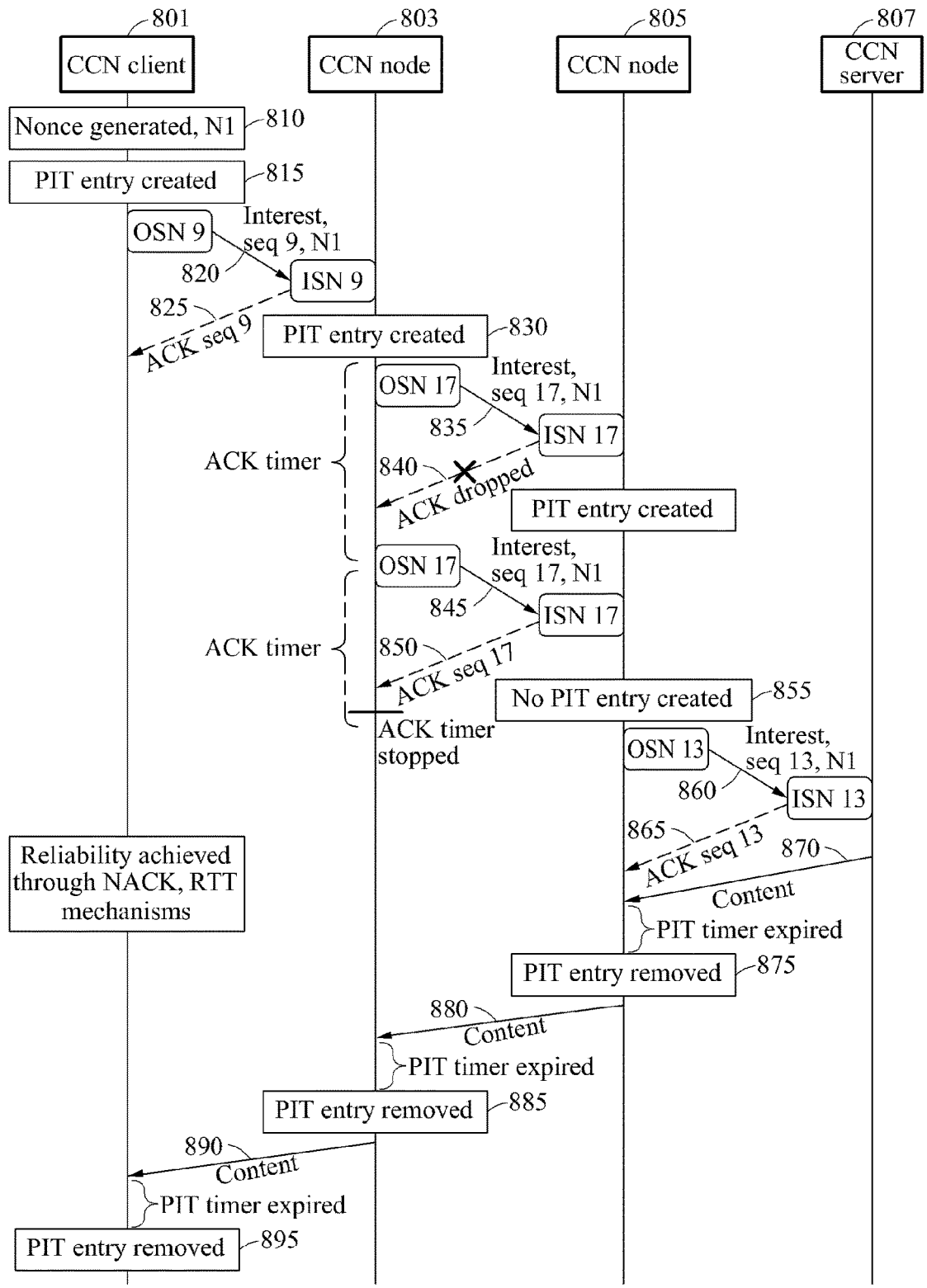
FIG. 8 illustrates another example of an operation when an ACK packet is dropped between nodes in a CCN.

FIG. 8 illustrates another example of an operation when an ACK packet is dropped between nodes in a CCN.

Referring to the example of FIG. 8, a CCN client 801 generates an interest in operation 810, and also creates or marks an entry into a PIT associated with the CCN client 801 in operation 815. In such an example, the interest generated at the CCN client 801 is associated with an OSN that is a sequence number of an outgoing interest from a node. The OSN of the interest is, for example, '9'.

As discussed previously, the OSN of the interest is modified at each node based on the availability of content at each node in the CCN, appropriately.

In operation 820, the CCN client 801 sends the interest to a node 803. Here, the client 801 also initializes an ACK timer of the CCN client 801 after sending the interest to the node 803.

The node 803 then receives the interest with the OSN '9' from the CCN client 801. An ISN of the interest received at the node 803 is, for example, '9', so as to correspond to the OSN of the interest.

When the node 803 receives the interest from the CCN client 801, the node 803 immediately responds with an ACK message before processing the interest in operation 825. Also, when the ACK message is received from the node 803, the ACK timer of the CCN client 801 is stopped accordingly.

When the interest is received, the node 803 creates or marks an entry in a PIT in operation 830. For example, when such an entry is created in the PIT of the node 803, the ISN '9' associated with the interest is stored in the PIT.

In operation 835, the node 803 sends the interest to a next node, for example, a node 805 after processing the interest. In this example, the sequence number of the interest is stored in the PIT of the node 803 as being OSN '17' before being sent to the next node, for example, the node 805.

Subsequently, the ISN of the interest received at the node 805 from the node 803 is '17'.

In an example, the node 805 generates an ACK message acknowledging reception of the interest and sends the ACK message to the node 803. In the example of FIG. 8, in operation 840, the ACK message is dropped between the nodes 803 and 805 due to, for example, network congestion.

When the ACK message is dropped during the delivery and is not received at the node 803, the node 803 resends the interest with the OSN '17' to the node 805 after expiry of the ACK timer in operation 845. One goal of the resending is to ensure that the transmission is successful. The ISN of the interest resent to the node 805 is, for example, '17', in accordance with the corresponding OSN. The interest resent in operation 845 includes the same nonce as the nonce generated at the CCN client 801, and the nonce is used as part of the authentication, as discussed further below.

In response to the interest being resent in operation 845, the node 803 receives the ACK message from the node 805 in operation 850. The node 805 then sends the ACK message to the node 803 before the ACK message of the node 803 has expired.

In such an example, since a PIT entry for the interest sent in operation 835 is created in a PIT of the node 805, the node 805 does not create the PIT entry in operation 855.

Accordingly, the interest resent from the node 803 to the node 805 in operation 845 holds the same ISN '17' as the ISN of the interest sent in operation 835. Preserving the ISN helps identify the interest when it is resent.

When the resent interest is received at the node 805, the node 805 searches the PIT of the node 805 for entries that match the sequence number and finds a matching entry in order to properly respond to the receipt of the interest.

As a result of an existing PIT entry being present in the PIT due to the interest sent in operation 835, the node 805 sends the ACK message to the node 803. Then, the node 805 drops the interest without performing additional interest processing.

In operation 860, the node 805 sends the interest to a CCN server 807. In the example of FIG. 8, the OSN of the interest sent from the node 805 is, for example, '13' and the ISN of the interest received at the CCN server 807 is, for example, '13', so that these two values correspond to one another.

In response to the interest being received from the node 805, the CCN server 807 sends an ACK message to the node 805 in operation 865. The CCN server 807 then starts processing the interest, after sending the ACK message to the node 805.

In operation 870, the CCN server 807 processes the interest and then sends content matched with the interest to the node 805 in order to fulfill the content demands of the interest.

In an example, when the content is received from the CCN server 807, the node 805 marks a corresponding PIT entry using a STALE flag. The node 805 initializes the PIT timer of the node 805 upon receiving the content from the CCN server 807.

When the PIT timer has expired, the node 805 removes the PIT entry from the PIT in operation 875.

In operation 880, the node 805 caches the content received from the CCN server 807 and then sends the content to the node 803.

When the content is received at the node 803, the node 803 marks the corresponding PIT entry using a STALE flag. Further, in operation 885, the node 803 removes the corresponding PIT entry from the PIT of the node 803 upon the expiry of the PIT timer. Then, the node 803 initializes the PIT timer.

In operation 890, the node 803 caches the content received from the node 805 and then sends the content to the CCN client 801.

The CCN client 801 marks the corresponding PIT entry using a STALE flag and initializes the PIT timer upon receiving the content from the node 803. In operation 895, the CCN client 801 removes the corresponding PIT entry upon expiry of the PIT timer.

Figure 9:
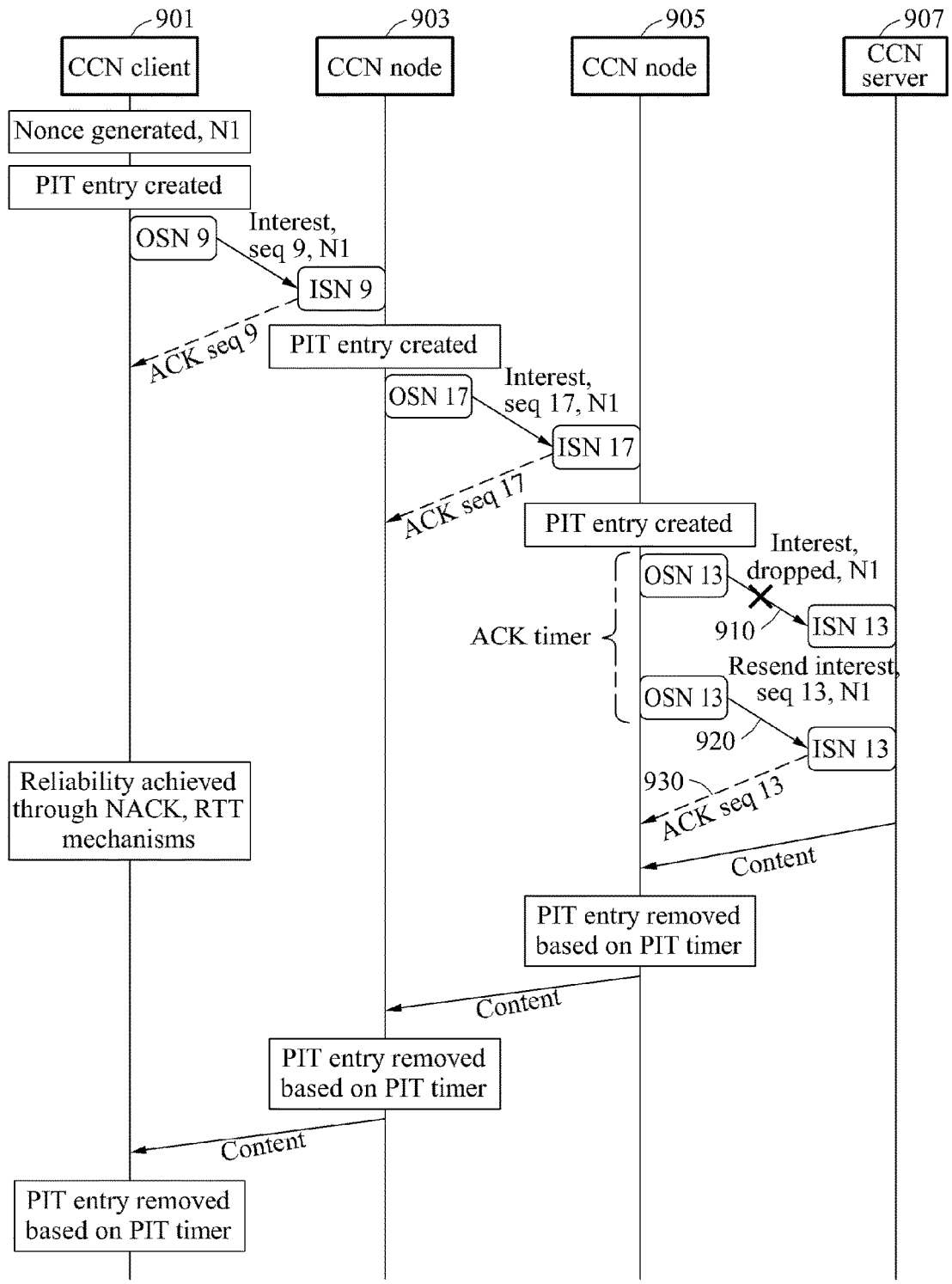
FIG. 9 illustrates an example of a process of resending an interest after expiry of an ACK timer when an interest is dropped between nodes in a CCN.

FIG. 9 illustrates an example of a process of resending an interest after expiry of an ACK timer when an interest is dropped between nodes in a CCN.

In FIG. 9, an interest is resent to a node that has failed in responding with an ACK message after the expiry of the ACK timer.

Operations performed between a CCN client 901 and a node 905 of FIG. 9 are the same as the process of operations 810 through 835 of FIG. 8 and thus, the description presented for FIG. 8 is the same and hence is omitted for brevity. In FIG. 9, an operation between the node 905 and a CCN server 907 performed after creating a PIT entry at the node 905 is described based on the assumption that the ACK message sent from the node 805 is accurately received at the node 803 in operation 840 of FIG. 8.

However, in operation 910, an interest with OSN '13' sent from the 905 is dropped between the node 905 and the CCN server 907. Thus, because the interest was dropped, certain additional steps occur, as discussed further, below.

When the interest is dropped, the ACK message is not received at the node 905 in response to the interest before the expiry of the ACK timer. Therefore, in this example, the node 905 resends the interest with the OSN '13' to the CCN server 907 in operation 920. Hence, even though the interest was dropped, because the interest is resent due to the ACK message not being received, the resending allows recovery of the interest that is dropped.

The CCN server 907 then receives the interest with ISN '13' resent from the node 905.

Hence, when the interest resent from the node 905 is received at the CCN server 907, the CCN server 907 sends the ACK message corresponding to the interest to the node 905 in operation 930. As a result, the interest is fulfilled and acknowledged even though the interest was originally dropped.

Subsequent operations performed between the CCN server 907 and the CCN client 901 are the same as a process of operations 870 through 895 of FIG. 8 and thus, correspond to the description related to these operations, which is not repeated for brevity.

Figure 10:
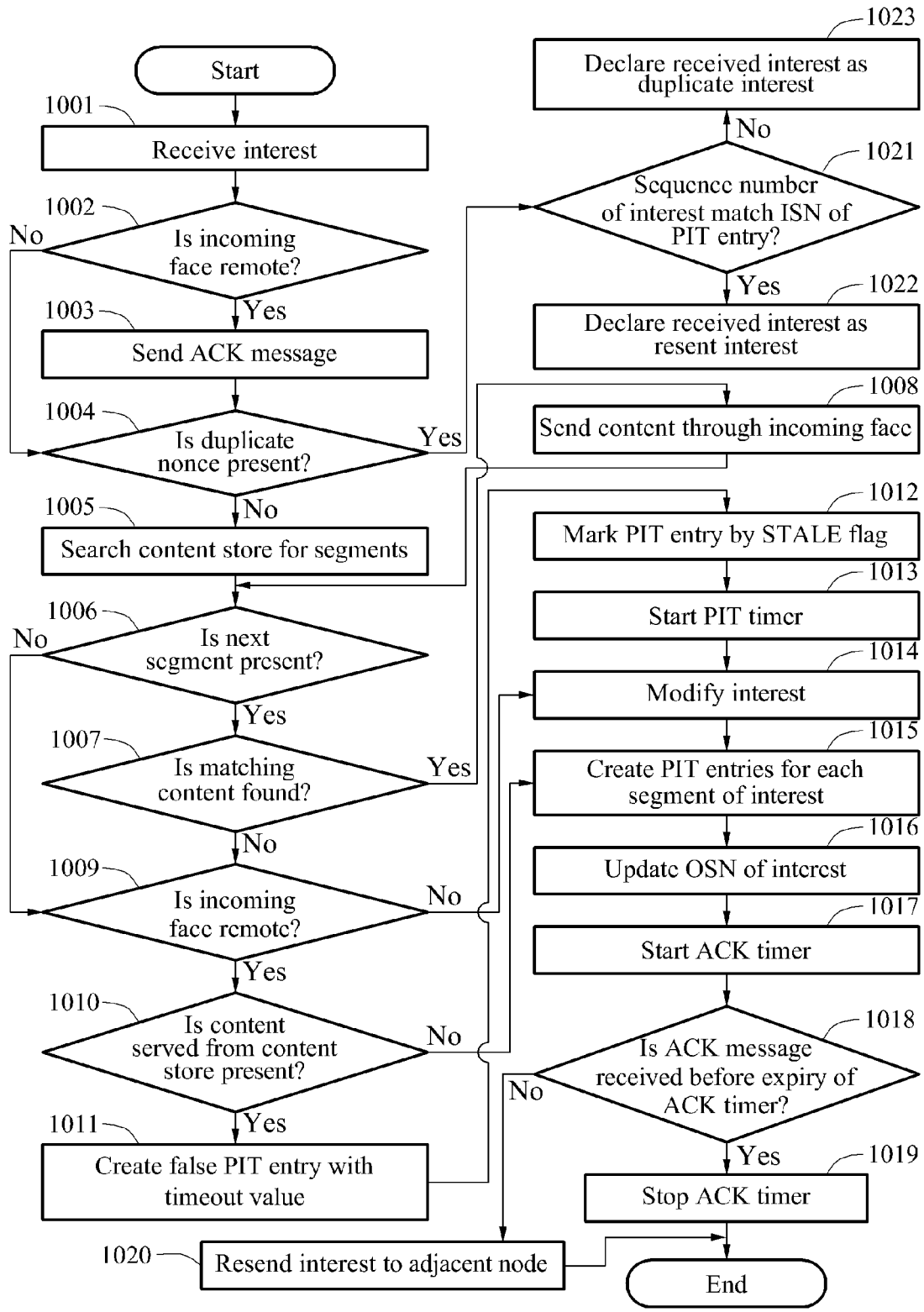
FIG. 10 is a flowchart illustrating an example of a method of processing an interest at each node in a CCN.

FIG. 10 illustrates an example of a method of processing an interest at each node in a CCN.

Referring to the example of FIG. 10, in operation 1001, the method receives an interest from an interest owner in the CCN. For example, a node receives an interest from an interest owner in the CCN. Here, the interest owner is to be understood to be a node that has generated and sent the interest in the CCN.

In operation 1002, the method determines whether an incoming face through which the interest is received is remote or local. For example, the node determines whether an incoming face through which the interest is received is remote or local. The term 'face' indicates a path through which a communication packet is transferred and is also represented and/or referred to as an interface.

When the incoming face is determined to be remote in operation 1002, in operation 1003, the method sends an ACK message in response to the interest received through the incoming face For example, the node sends an ACK message in response to the interest received through the incoming face.

Conversely, when the incoming face is determined to be local in operation 1002, in operation 1004, the node determines whether a duplicate nonce generated at the interest owner is present in the interest.

When the duplicate nonce generated at the interest owner is determined to be present in operation 1004, in operation 1021, the method determines whether an ISN of the interest matches an ISN of a PIT entry. For example, the node determines whether an ISN of the interest matches an ISN of a PIT entry.

When the ISN of the interest is determined to match the ISN of the PIT entry in operation 1021, in operation 1022, the method declares the interest received in operation 1001 as the interest resent from the interest owner. For example, the node declares the interest received in operation 1001 as the interest resent from the interest owner.

When the ISN of the interest is determined not to match the ISN of the PIT entry in operation 1021, in operation 1023, the method declares that the interest received in operation 1001 is duplicate or redundant. For example, the node declares that the interest received in operation 1001 is duplicate or redundant. After declaring in operations 1022 and 1023, the method terminates the operation. For example, the node terminates the operation.

When the duplicate nonce generated at the interest owner is determined to be absent in operation 1004, in operation 1005, the method searches a content store of the node for segments in the interest. For example, the node searches a content store of the node for segments in the interest. In operation 1006, the method determines whether to search the content store for a next segment in the interest. For example, the node determines whether to search the content store for a next segment in the interest.

When the next segment to be searched in the content store is determined to be present in operation 1006, in operation 1007, the method determines whether a match, for example, content or a segment, for the next segment is found in the content store. For example, the node determines whether a match, for example, content or a segment, for the next segment is found in the content store.

When the content matching the next segment is found in operation 1007, in operation 1008 the method returns to operation 1006 after sending the content through an incoming face. For example, the node returns to operation 1006 after sending the content through an incoming face.

Conversely, when the next segment to be searched in the content store is determined to be absent in operation 1006, in operation 1009, the method determines whether the incoming face of the node is remote. For example, the node determines whether the incoming face of the node is remote.

When the content matching the next segment in the interest is determined to be absent in the content store in operation 1007, in operation 1009, the method node determines whether the incoming face of the node is remote. For example, the node determines whether the incoming face of the node is remote.

When the incoming face is determined to be remote in operation 1009, in operation 1010, the method determines whether content served from the content store is present. For example, the node determines whether content served from the content store is present.

When the content served from the content store is determined to be present in operation 1010, in operation 1011, the method creates a false PIT entry with a timeout value to avoid an answer to resent interests. For example, the node creates a false PIT entry with a timeout value to avoid an answer to resent interests. Further, in operation 1012, the method marks the PIT entry by a STALE flag to avoid resending the content through the incoming face. For example, the node marks the PIT entry by a STALE flag to avoid resending the content through the incoming face. In operation 1013, the method starts the PIT timer to avoid an answer to the resent interests. For example, the node starts the PIT timer to avoid an answer to the resent interests.

When the content served from the content store is determined to be absent in operation 1010, in operation 1015, the method creates PIT entries for each segment of the interest. For example, the node creates PIT entries for each segment of the interest. When the PIT entries are created for each segment of the interest in operation 1015, in operation 1016, the method updates the OSN of the modified interest. For example, the node updates the OSN of the modified interest.

In operation 1017, the method starts the ACK timer for the modified interest before sending the modified interest to an adjacent node in the CCN. For example, the node starts the ACK timer for the modified interest before sending the modified interest to an adjacent node in the CCN.

When the node starts the ACK timer in operation 1017, in operation 1018, the method determines whether an ACK message is received from the adjacent node in the CCN before expiry of the ACK timer. For example, the node determines whether an ACK message is received from the adjacent node in the CCN before expiry of the ACK timer. When the ACK message is received from the adjacent node before the expiry of the ACK timer in operation 1018, in operation 1019, the method stops the ACK timer. For example, the node stops the ACK timer. Conversely, when the ACK message is not received from the adjacent node before the expiry of the ACK timer, in operation 1020, the method resends the interest to the adjacent node in the CCN. For example, the node resends the interest to the adjacent node in the CCN. After performing operation 1019 or 1020, the method terminates its operation. For example, the node terminates its operation.

When the incoming face is determined not to be remote, that is, is determined to be local in operation 1009, the method returns to operation 1014 and performs subsequent operations. For example, the node returns to operation 1014 and performs subsequent operations.

In an example, the node starts the ACK timer after resending the interest to the adjacent node. In this example, three interests are resent from the node. When each interest is resent to the adjacent node and the ACK message is not received at the node before expiry of the ACK timer, the node resends the appropriate interest to the adjacent node in the CCN. When the ACK message is not received at the node before the expiry of the ACK timer, the interest is resent to the adjacent node, for example, three times. However, when the ACK message is not received at the node even after resending the interest three times, the node stops the ACK timer. Hence, it is possible for there to be an upper bound on the number of times an example is designed to resend an interest if there is a problem with successfully obtaining content to fulfill an interest.

Various operations, units, blocks, or acts described in the example of FIG. 10 are performed, in various examples, in an order presented, in a different order, simultaneously, or using a combination thereof. Further, in the examples, a portion of the operations, the units, the blocks, or the acts listed in the example of FIG. 10 are optionally omitted, or additional operations are performed in addition to or instead of the operations described.

Figure 11:
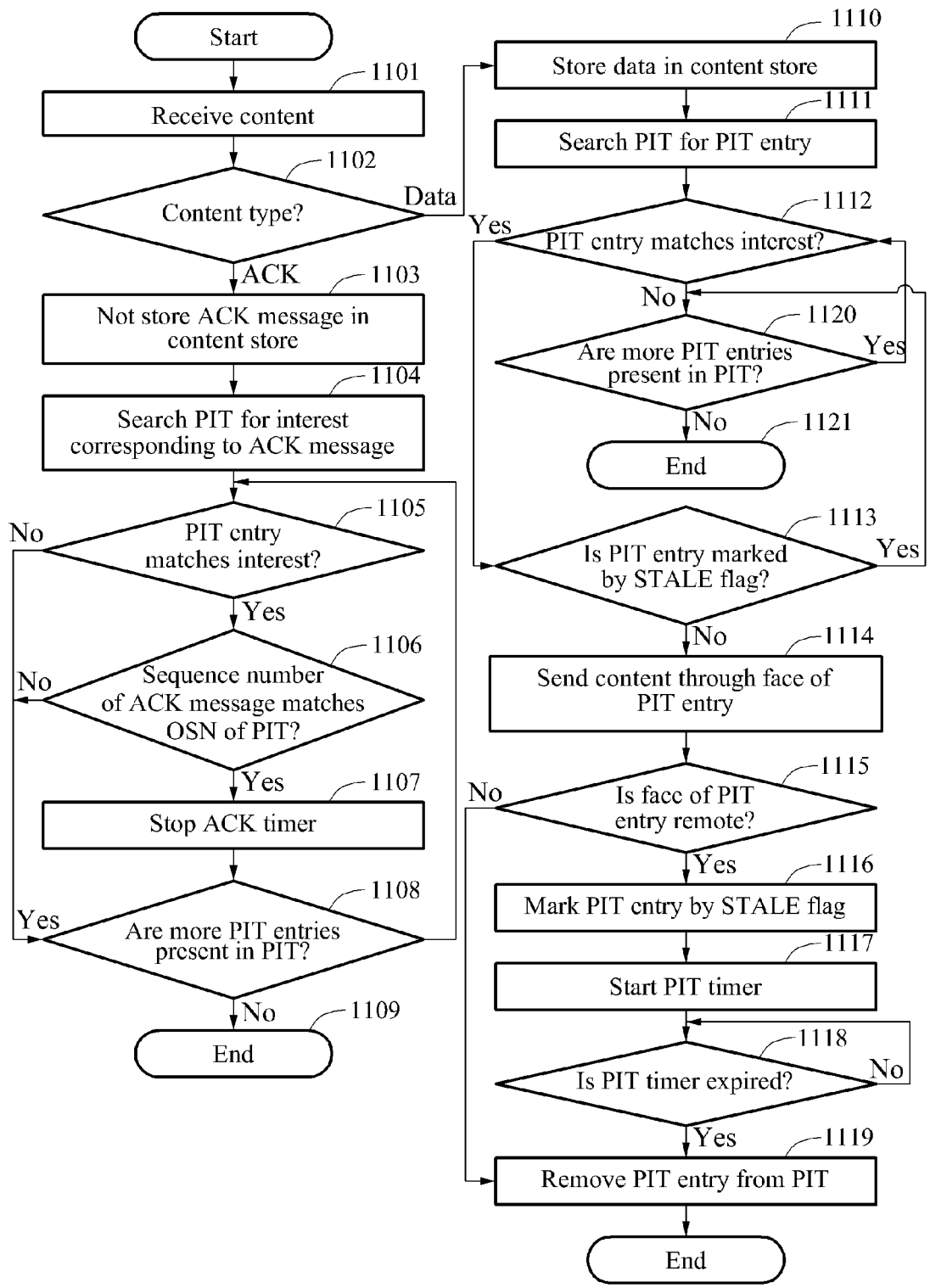
FIG. 11 is a flowchart illustrating an example of a method of processing incoming content received at a node from an adjacent node in a CCN.

FIG. 11 is a flowchart illustrating an example of a method of processing incoming content received at a node from an adjacent node in a CCN.

Referring to FIG. 11, in operation 1101, receives content from an adjacent node or nodes in the CCN. For example, a node receives content from an adjacent node or nodes in the CCN.

In operation 1102, the method determines a type of content received from the adjacent node in the CCN. For example, the node determines a type of content received from the adjacent node in the CCN. When the type of the received content is determined to be an ACK message, in operation 1103 the method does not store the ACK message in a content store. For example, the node does not store the ACK message in a content store. In operation 1104, the method searches a PIT for an interest corresponding to the ACK message. For example, the node searches a PIT for an interest corresponding to the ACK message.

In operation 1105, the method determines whether a PIT entry matches the interest corresponding to the ACK message. For example, the node determines whether a PIT entry matches the interest corresponding to the ACK message.

When the PIT entry is determined to match the interest in operation 1105, in operation 1106, the method determines whether a sequence number of the ACK message matches an OSN of the PIT. For example, the node determines whether a sequence number of the ACK message matches an OSN of the PIT. When the sequence number of the ACK messages is determined to match the OSN of the PIT in operation 1106, in operation 1107, the method stops an ACK timer. For example, the node stops an ACK timer.

When the PIT entry is determined not to match the ACK message in operation 1105, in operation 1108, the method determines whether more PIT entries are present in the PIT. For example, the node determines whether more PIT entries are present in the PIT. When the more PIT entries are determined to be present in the PIT in operation 1108, the method performs operation 1108. For example, the node performs operation 1105. Conversely, when no other entries are determined to be present in the PIT in operation 1108, in operation 1109, the method performs operation 1105. For example, the node terminates the process in operation 1109.

When the sequence number of the ACK message is determined not to match the OSN of the PIT in operation 1106, in operation 1108, the method determines whether more PIT entries are present in the PIT. For example, the node determines whether more PIT entries are present in the PIT. The method terminates the process in operation 1109 or returns to operation 1105 depending on whether the PIT entries are present in the PIT. For example, the node terminates the process in operation 1109 or returns to operation 1105 depending on whether the PIT entries are present in the PIT.

When the type of the content received from the node is determined to be data in operation 1105, in operation 1110, the method stores the received data in a content store of the node. For example, the node stores the received data in a content store of the node. In operation 1111, the method searches the PIT for a PIT entry to match the received content with the interest. For example, the node searches the PIT for a PIT entry to match the received content with the interest. In operation 1112, the method determines whether the PIT entry is matched with the interest. For example, the node determines whether the PIT entry is matched with the interest. In such an example, an OSN of the interest is matched with the PIT entry to determine whether there is a match between the PIT entry and the interest received at the node.

When the interest is determined to be matched with the PIT entry in operation 1112, in operation 1113 the method determines whether the PIT entry in the PIT is marked by a STALE flag. For example, the node determines whether the PIT entry in the PIT is marked by a STALE flag in operation 1113. When the PIT entry is not marked by the STALE flag in operation 1113, in operation 1114, the method sends the content through a face of the PIT entry. For example, the node sends the content through a face of the PIT entry.

Further, in operation 1115, the method determines whether the face of the PIT entry is remote. For example, the node determines whether the face of the PIT entry is remote. When the face of the PIT entry is determined to be remote in operation 1115, in operation 1116, the method marks the PIT entry by the STALE flag to avoid resending of the content in operation 1116. For example, the node marks the PIT entry by the STALE flag to avoid resending of the content in operation 1116. In such an example, as described above, in the examples of FIGS. 7 and 9 in which the ACK message is dropped or the interest packet is dropped, in operation 1117 the method starts a PIT timer to avoid an answer to the resent interests. For example, the node starts a PIT timer to avoid an answer to the resent interests.

In operation 1118, the method determines whether the PIT timer has expired. For example, the node determines whether the PIT timer has expired. When the PIT timer is not expired in operation 1118, the method waits for expiry of the PIT timer. For example, the node waits for expiry of the PIT timer.

When the PIT timer has expired in operation 1118, in operation 1119 the method removes the PIT entry from the PIT and terminates the process. For example, the node removes the PIT entry from the PIT and terminates the process.

When the interest is determined not to be matched with the PIT entry in operation 1112, in operation 1120, the method determines whether more PIT entries are present in the PIT. For example, the node determines whether more PIT entries are present in the PIT. When more PIT entries are determined to be present in the PIT in operation 1120, the method returns to operation 1112 and determines whether the PIT entry is matched with the interest. For example, the node returns to operation 1112 and determines whether the PIT entry is matched with the interest. When no more entries are determined to be present in the PIT in operation 1120, in operation 1121, the method terminates the process. For example, the node terminates the process.

Various operations, units, blocks, or acts described in the example of FIG. 11 may be performed in an order presented, in a different order, simultaneously, or using a combination thereof. Further, in the examples, a portion of the operations, the units, the blocks, or the acts listed in the example of FIG. 11 are optionally omitted, or additional operations are performed in addition to or instead of the operations described.

Figure 12:
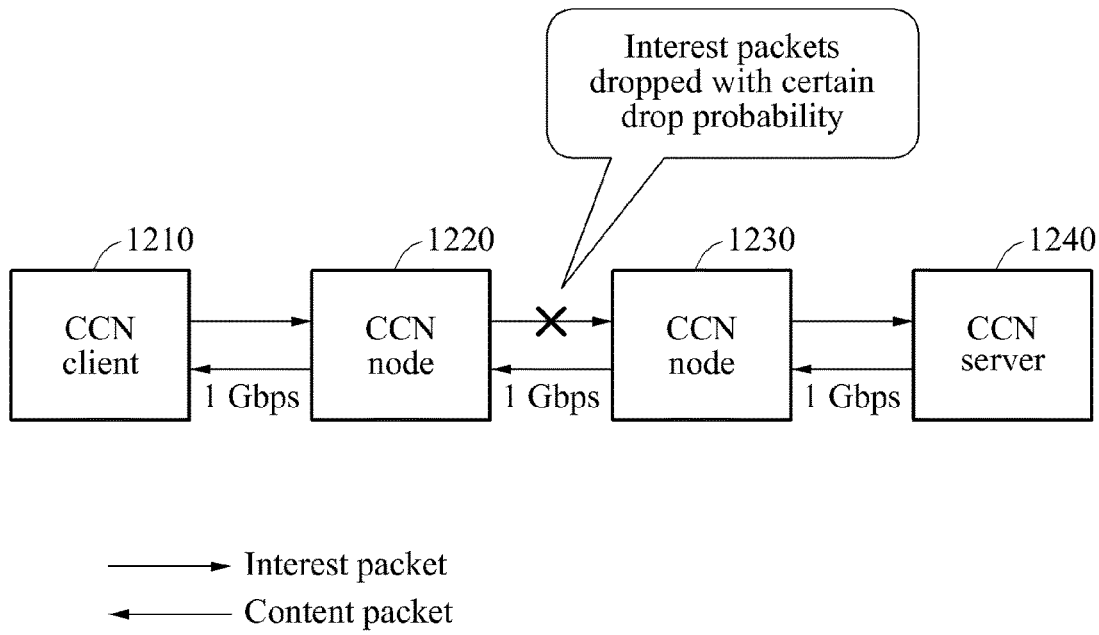
FIG. 12 is a diagram illustrating an example in which an interest is dropped between nodes in a CCN.

FIG. 12 illustrates an example in which an interest is dropped between nodes in a CCN.

Referring to the example of FIG. 12, the CCN includes a CCN client 1210, CCN nodes 1220 and 1230, and a CCN server 1240.

The CCN client 1210 requests a 100 MB file over a user datagram protocol (UDP) connection with an ACK mechanism, according to an example, used for ensuring the reliable delivery of an interest at each node in the CCN.

Referring to the example of FIG. 12, an interest is dropped with a predetermined drop probability between the CCN nodes 1220 and 1230. In this instance, it is assumed that only the interest is dropped and the content is not dropped between the CCN nodes 1220 and 1230.

When the drop probability of the interest varies from 0 to 0.5, the node measures a corresponding throughput. Thus, in the example of FIG. 12, the ACK mechanism is not used and the maximum redundant interest deliverable from the node increases from 3 to 10000. The number '10000' is a value arbitrarily selected to allow a plurality of similar interests to be forwarded to nodes, and is chosen to have a large value such the interest is resent many times, even if the interest is dropped a few times.

Figure 13:
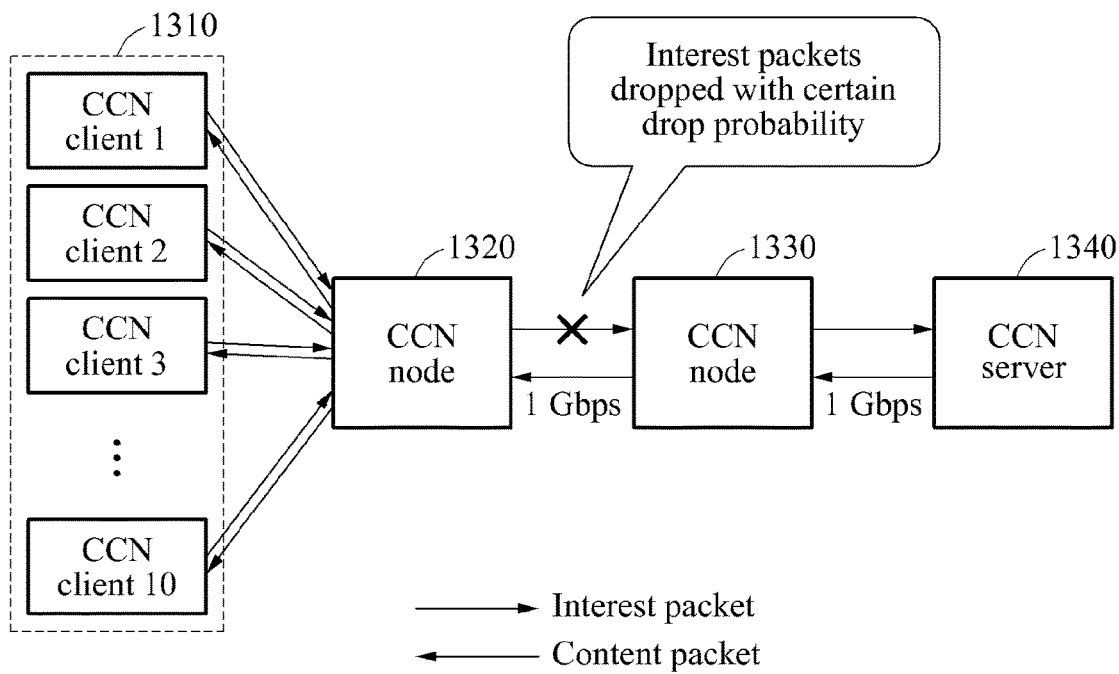
FIG. 13 is a diagram illustrating an example in which an interest is dropped in one of two nodes in a CCN including a plurality of CCN clients.

FIG. 13 illustrates an example in which an interest is dropped in one of two nodes in a CCN including a plurality of CCN clients.

Referring to the example of FIG. 13, the CCN includes a plurality of CCN client nodes 1310, two CCN nodes 1320 and 1330, and a CCN server 1340.

An ACK mechanism according to an example maintains fairness in delivery across a plurality of clients requesting the same content simultaneously. In the scenario of FIG. 13, behaviors for various drop probabilities are analyzed and the results thereof are shown in further detail in FIG. 16. It is to be observed that the fairness is maintained across the different clients with respect to different interest drop probabilities as the interests are sent and resent in the CCN.

Figure 14:
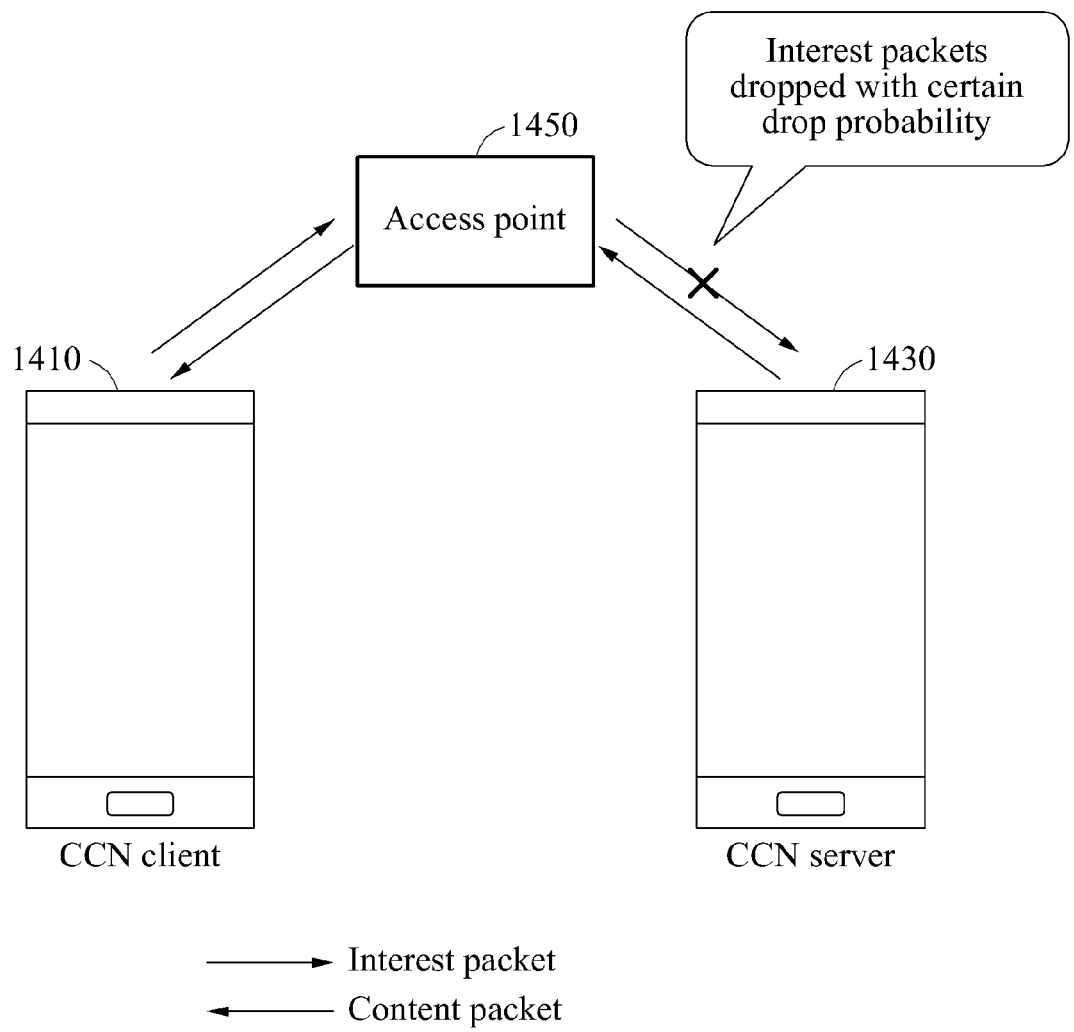
FIG. 14 is a diagram illustrating an example in which an interest sent between one of two mobile devices and an access point is dropped.

FIG. 14 illustrates an example in which an interest sent between one of two mobile devices and an access point is dropped.

Referring to FIG. 14, two mobile devices 1410 and 1430 are connected to an access point 1450. Here, one mobile device serves as a CCN client 1410 and the other one serves as a CCN server 1430. Thus, in the example of FIG. 14, the mobile device 1410 is the CCN client and the mobile device 1430 is the CCN server. An interest drop having a predetermined probability is performed at an interface of the CCN server 1430.

Figure 17:
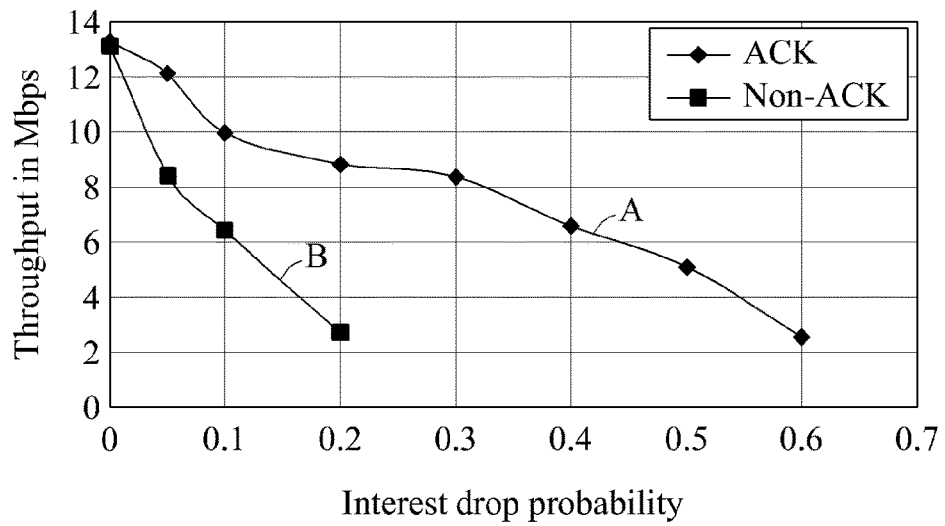
FIG. 17 is a graph showing an example of a result of comparing a throughput with an ACK mechanism and a throughput with a non-ACK mechanism with respect to the example of FIG. 14.

In this scenario, test results for a case with the ACK mechanism as provided in examples and a case with the non-ACK mechanism are shown in FIG. 17.

As shown in FIG. 17, the above two cases are performed almost in the same manner when no interests are dropped. Thus, it can be observed that overhead occurs due to delivery of an ACK message, but, such overhead is beneficial in terms of throughput and performance.

For example, when 60% of interests are dropped, the ACK mechanism provides 19.52% of throughput compared to throughput with no interest drop, as shown in FIG. 17. Referring to FIG. 17, when 20% of interests are dropped, the non-ACK mechanism provides 20.5% of ideal no-drop throughput. Further, the non-ACK mechanism fails to complete a file download when an interest drop probability drops beyond 20%.

As a result of introducing a STALE flag for tracking a PIT entry and starting of a PIT entry timer as provided in examples, an amount of memory required potentially overall increases. Considering that the throughput was relatively high in the case of the ACK mechanism, the increase in the memory is generally acceptable tradeoff because of the better performance.

Figure 15:
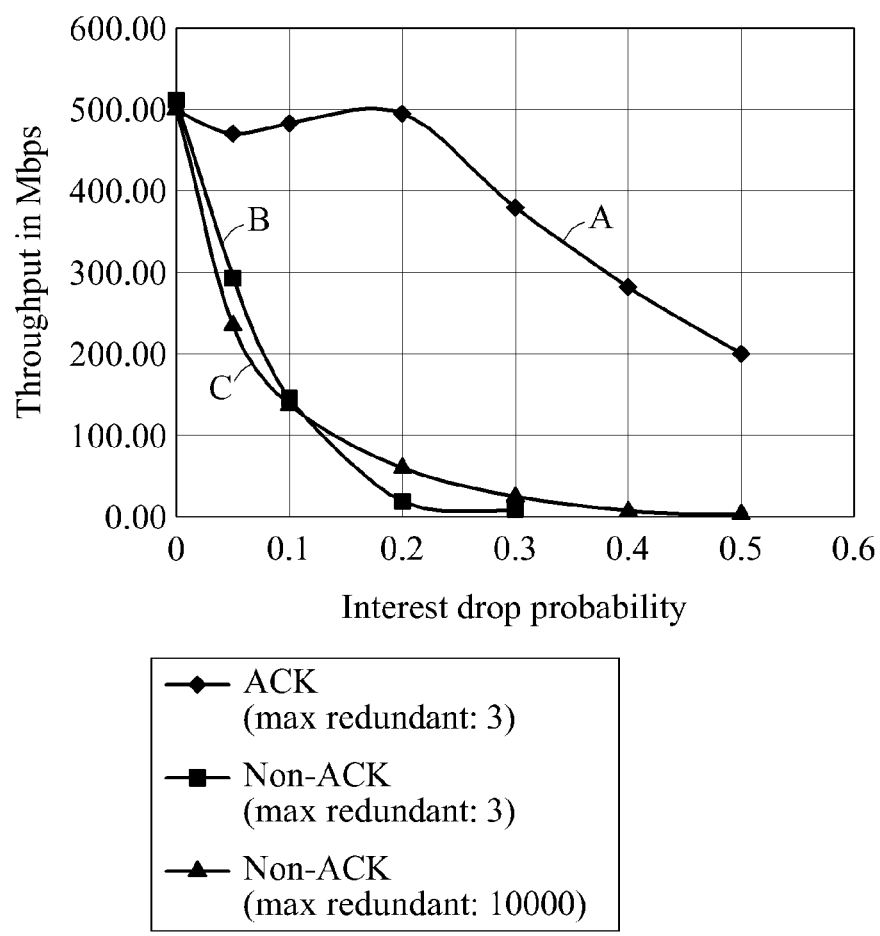
FIG. 15 is a graph showing an example of a result of comparing a throughput with an ACK mechanism and a throughput with a non-ACK mechanism with respect to the example of FIG. 12.

FIG. 15 is a graph showing an example of a result of comparing a throughput with an ACK mechanism and a throughput with a non-ACK mechanism with respect to the example of FIG. 12.

In FIG. 15, each node allows three duplicate interests to be sent through the non-ACK mechanism.

The results obtained from the scenario of FIG. 12 may be compared with the ACK mechanism of examples and two other possible ACK mechanisms in the CCN.

In a first non-ACK mechanism, the maximum number of redundant interests is 3. In a second non-ACK mechanism, the maximum number of redundant interests is 10000.

Referring to a curve A showing the throughput for the ACK mechanism of examples, FIG. 15 shows that a throughput of 200 Mbps is achieved for the interest drop probability of 0.5. In contrast, referring to a curve B showing the throughput for the non-ACK mechanism having the maximum 3 redundant interests for the interest drop probability of 0.3, the throughput drops down to zero.

Furthermore, referring to a curve C showing the throughput for the non-ACK mechanism having the maximum 10000 redundant interests, the throughput for the interest drop probability of 0.5 is very low.

Figure 16:
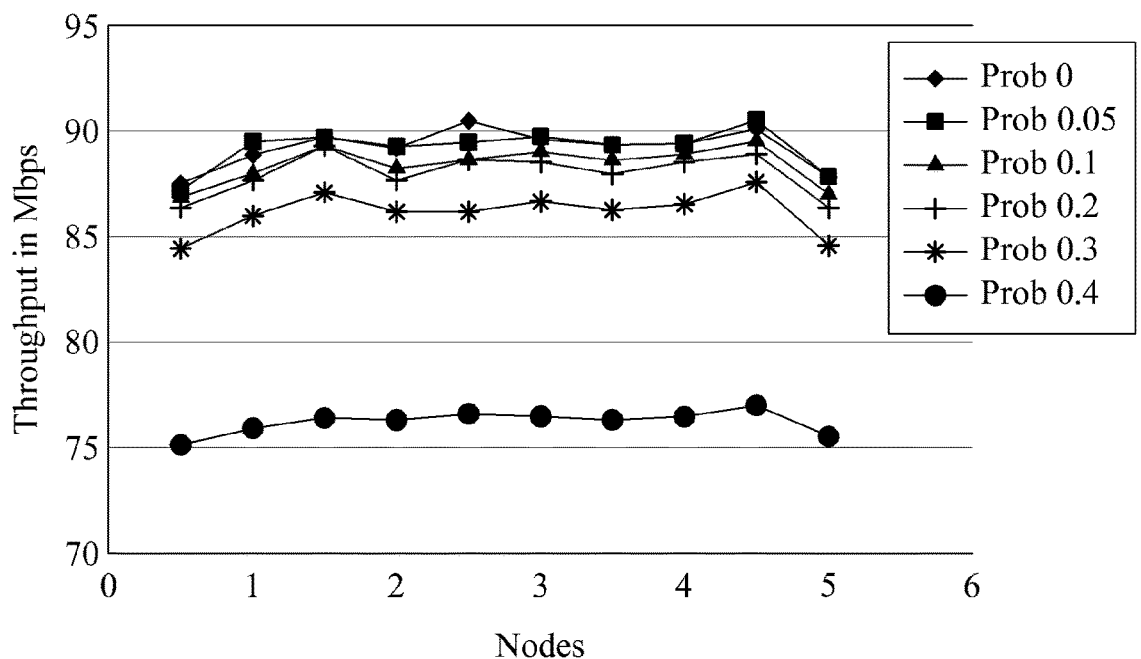
FIG. 16 is a graph showing an example of a throughput comparison result with respect to the example of FIG. 13 that has varying probabilities across the increasing number of nodes.

FIG. 16 is a graph showing an example of a throughput comparison result with respect to the example of FIG. 13 that has varying probabilities across the increasing number of nodes.

From the graph, it is observable that all the CCN clients of FIG. 13 have achieved the similar throughput for different interest drop probabilities. Referring to the graph, the throughput appears linear for all the CCN clients across the interest drop probabilities from zero to 0.4. The throughput is maintained so as to be the same across all the CCN clients.

Referring to FIG. 16, the graph of FIG. 16 illustrates that the fairness is maintained for different clients irrespective of different interest drop probabilities.

FIG. 17 is a graph showing an example of a result of comparing a throughput with an ACK mechanism and a throughput with a non-ACK mechanism with respect to the example of FIG. 14.

Referring to FIG. 17, a curve A shows the throughput using the ACK mechanism of examples and a curve B shows the throughput with the non-ACK mechanism of alternatives.

It is observable from the curve A using the ACK mechanism that 19.25% of throughput is achieved with the drop probability of 0.6, whereas it is observable from the curve B using the non-ACK mechanism that 20% of throughput is achieved with the drop probability of 0.2 and no throughput is achieved beyond the drop probability of 0.2.

Figure 18:
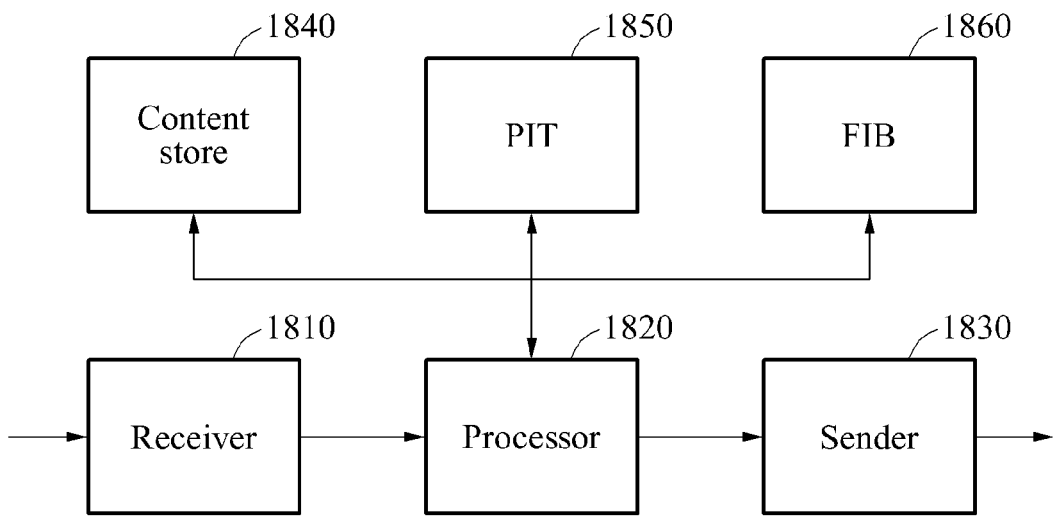
FIG. 18 is a block diagram illustrating an example of a node.

FIG. 18 is a block diagram illustrating an example of a node.

Referring to the example of FIG. 18, the node 1800 includes a receiver 1810, a processor 1820, and a sender 1830. The node 1800 further includes a content store 1840, a PIT 1850, and a FIB 1860. However, these elements are only examples, and some examples of nodes include additional appropriate elements in addition to or instead of these elements.

In the example of FIG. 18, the receiver 1810 receives a first interest requesting content from a previous node in a CCN.

The processor 1820 generates a first ACK message indicating reception of the first interest in response to the first interest.

The sender 1830 sends the first ACK message to the previous node.

The content store 1840 stores content. When the content associated with the first interest is absent in the content store 1840 after the first ACK message is sent from the sender 1830, the processor 1820 generates a second interest, as it is necessary to propagate the interest further to fulfill it with appropriate content. The processor 1820 sends the second interest to a next node through the sender 1830.

The PIT 1850 includes PIT entries. Accordingly, the processor 1820 creates a PIT entry associated with the first interest in the PIT 1850 and also stores a sequence number associated with the first interest in the PIT entry.

When an entry to be searched in the PIT 1850 is absent, the processor 1820 searches the FIB 1860. The processor 1820 conducts a search for information about a prefix based on a longest prefix matching and a prefix registered to an entry of the FIB 1860.

Then, the processor 1820 starts an ACK timer upon generating the second interest and sending the second interest to the next node, and stops the ACK timer when a second message responding to the second interest is received from the next node through the receiver 1810.

When the second message is not received by the expiry of the ACK timer, the processor 1820 resends the second interest to the next node and starts the ACK timer with a predetermined backoff timeout value, as discussed further above.

The processor 1820 marks a PIT entry of the node using a STALE flag upon receiving the content from the next node, starts a PIT timer corresponding to the PIT entry, and removes the PIT entry form the PIT of the node upon the expiry of the PIT timer.

Figure 19:
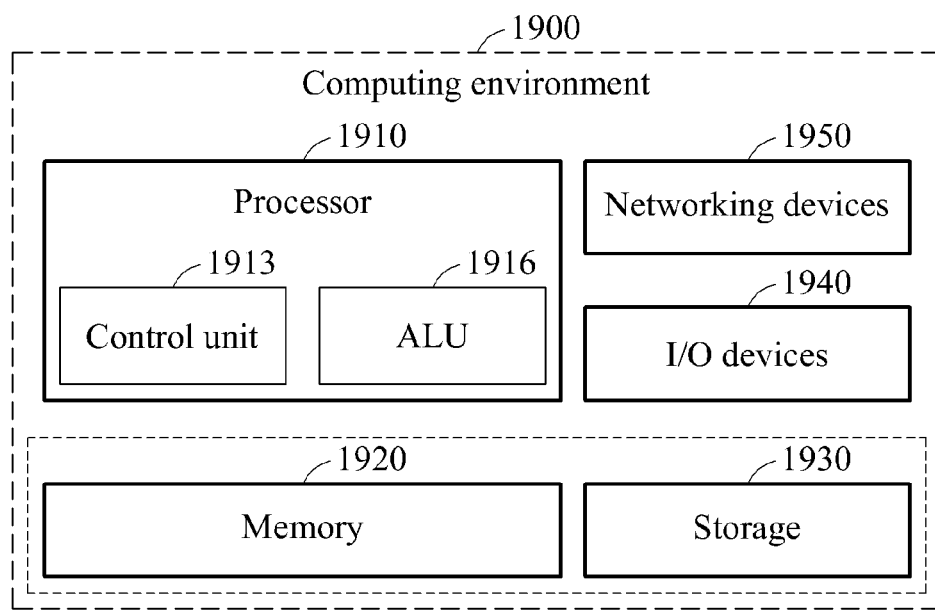
FIG. 19 is a block diagram illustrating an example of a computing environment for controlling delivery of an interest in a CCN.

FIG. 19 is a block diagram illustrating an example of a computing environment for controlling sending of an interest in a CCN.

Referring to FIG. 19, the computing environment 1900 includes at least one processor 1910, a memory 1920, a storage 1930, a plurality of networking devices 1950, and a plurality of input/output (I/O) devices 1940. However, these elements are examples, and other examples optionally include additional elements in addition to or instead of these examples.

In various examples, the computing environment 1900 includes a plurality of homogeneous and/or heterogeneous cores, different types of central processing units (CPUs), special media, and other accelerators.

In the example of FIG. 19, the processor 1910 includes a control unit 1913 and an arithmetic logic unit (ALU) 1916.

Thus, the processor 1910 processes instructions of an algorithm.

For example, the processor 1910 receives instructions from the control unit 1913 to perform processing thereof. Further, logic and arithmetic operations associated with execution of the instructions are calculated with the assistance of the ALU 1916.

In examples, a single processor 1910 or a plurality of processors 1910 are located on a single chip or over a plurality of chips.

Instructions and codes required for the examples are stored in at least one of the memory 1920 and the storage 1930. At the time of execution, the processor 1910 fetches the instructions from the memory 1920 and/or the storage 1930 and executes the fetched instructions accordingly.

In the case of a hardware implementation, various networking devices 1950 or the I/O devices 1940 in some examples are connected to the computing environment 1900 to support the implementation through a networking unit and an I/O device unit.

The apparatuses, units, modules, devices, and other components illustrated in FIGS. 1-19 that perform the operations described herein with respect to FIGS. 1-19 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-19. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-19 that perform the operations described herein with respect to FIGS. 1-19 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a terminal/device/unit as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), or any other device known to one of ordinary skill in the art as being suitable for inclusion in a computing system or computer. The memory controller and the flash memory device may constitute a solid-state drive or disk (SSD) that uses non-volatile memory to store data.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A communication method of a node, the method comprising:
   receiving a first interest that requests content from a previous node in a content centric network (CCN);
   generating a first acknowledgment (ACK) message indicating reception of the first interest in response to receiving the first interest;
   sending the first ACK message to the previous node;
   determining whether content associated with the first interest is present in a content store of the node;
   generating a second interest in response to an absence of the content associated with the first interest being in the content store of the node, after sending the first ACK message;
   sending the second interest to a next node;
   starting an ACK timer in response to sending the second interest to the next node; and
   in response to a second ACK message corresponding to the second interest or the second interest being dropped between nodes in the CCN with a drop probability, resending the second interest from the node to the next node after the ACK timer expires,
   wherein in order to reduce the waste of link between nodes by resending of unnecessary duplicate content, when the content is received from a next node included in the link, the node initializes and starts a PIT timer, and the node removes the PIT entry from a PIT of the node in response to expiry of the PIT timer, and wherein the PIT timer depends on the node.

2. The method of claim 1, wherein the generating of the first ACK message comprises generating the first ACK message using a unique sequence number associated with the first interest.

3. The method of claim 1, further comprising:
   creating a pending interest table (PIT) entry associated with the first interest in a PIT of the node after sending the first ACK message; and
   storing a sequence number associated with the first interest in the PIT entry.

4. The method of claim 1, further comprising:
   stopping the ACK timer in response to receiving the second ACK message corresponding to the second interest from the next node.

5. The method of claim 1, wherein the generating of the second interest comprises generating the second interest with a nonce.

6. The method of claim 1, wherein the second interest comprises parameters, and
   the parameters are altered based on an availability of content corresponding to the second interest in the node.

7. The method of claim 4, further comprising:
   resending the second interest to the next node in response to a failure to receive the second ACK message by expiry of the ACK timer.

8. The method of claim 7, further comprising:
   restarting the ACK timer with a backoff timeout value in response to resending the second interest.

9. The method of claim 1, wherein the second interest is associated with a unique sequence number capable of identifying the second interest, and
   the unique sequence number comprises an IN sequence number (ISN) and an OUT sequence number (OSN).

10. The method of claim 9, further comprising:
    storing the ISN in a PIT of the node in response to receiving the first interest.

11. The method of claim 9, further comprising:
    storing the OSN in a PIT of the node in response to sending the second interest to the next node.

12. The method of claim 1, wherein the sending of the first ACK message comprises:
    determining an incoming face through which the first interest is received as being remote or local; and
    sending the first ACK message in response to the first interest, in response to the incoming face being determined to be remote.

13. The method of claim 12, further comprising:
    determining a presence of a duplicate nonce generated at the previous node in the first interest, in response to the incoming face being determined to be local; and
    declaring the first interest as an interest resent by the previous node based on a matching between an ISN of the first interest and an ISN of an entry included in a PIT of the node, in response to the duplicate nonce being determined to be present.

14. The method of claim 4, further comprising:
    marking a PIT entry of the node using a STALE flag in response to receiving content from the next node.

15. The method of claim 14, wherein a value of the PIT timer is calculated based on a round trip time (RTT) of the node.

16. A non-transitory computer-readable storage medium storing a program for causing a processor to perform the method of claim 1.

17. A node comprising:
    a receiver configured to receive a first interest requesting content from a previous node in a content centric network (CCN);
    a processor configured to generate a first acknowledgment (ACK) message indicating reception of the first interest in response to receiving the first interest; and
    a sender configured to send the first ACK message to the previous node,
    wherein the processor is configured to determine whether content associated with the first interest is present in a content store of the node, to generate a second interest and to send the second interest to a next node in response to an absence of the content associated with the first interest being in the content store, after the sender sends the first ACK message, wherein the processor is further configured to start an ACK timer in response to sending the second interest to the next node, and in response to a second ACK message corresponding to the second interest or the second interest being dropped between nodes in the CCN with a drop probability, the processor is further configured to resend the second interest from the node to the next node after the ACK timer expires, wherein in order to reduce the waste of link between nodes by resending of unnecessary duplicate content, when the content is received from a next node included in the link, the node initializes and starts a PIT timer, and the node removes the PIT entry from a PIT of the node in response to expiry of the PIT timer, and wherein the PIT timer depends on the node.

18. The node of claim 17, further comprising:
a pending interest table (PIT) comprising PIT entries,
wherein the processor is configured to create a PIT entry associated with the first interest in the PIT, and to store a sequence number associated with the first interest in the PIT entry.

19. The node of claim 17, further comprising:
a content store configured to store the content.

20. The node of claim 19, wherein the processor is configured to stop the ACK timer in response to receiving the second ACK message corresponding to the second interest from the next node.

21. The node of claim 20, wherein the processor is configured to resend the second interest to the next node in response to a failure in receiving the second ACK message by expiry of the ACK timer, and to restart the ACK timer with a backoff timeout value.

22. The node of claim 20, wherein the processor is configured to mark a PIT entry of the node using a STALE flag in response to receiving content from the next node.

* * * * *